United States Patent [19]
Smarook

[11] 3,765,810
[45] Oct. 16, 1973

[54] MOLDING DEVICE

[75] Inventor: Walter H. Smarook, Somerville, N.J.

[73] Assignee: Union Carbide Corporation, New York, N.Y.

[22] Filed: Dec. 29, 1971

[21] Appl. No.: 213,276

[52] U.S. Cl.............. 425/110, 264/164, 425/394, 425/472, 425/DIG. 53
[51] Int. Cl............................................. B29c 27/14
[58] Field of Search................ 425/394, 396, 472, 425/DIG. 53, 110; 156/244; 264/164, 191

[56] References Cited
UNITED STATES PATENTS

| | | | |
|---|---|---|---|
| 2,962,409 | 11/1960 | Ludlow et al.................. | 156/244 X |
| 3,399,425 | 9/1968 | Lemelson....................... | 425/379 X |
| 2,502,304 | 3/1950 | Baker............................... | 264/41 X |
| 3,367,760 | 2/1968 | Bendig et al.................. | 264/291 X |
| 2,736,926 | 3/1956 | Johnson et al................ | 264/164 |

Primary Examiner—H. A. Kilby, Jr.
Attorney—Paul A. Rose et al.

[57] ABSTRACT

A device for expanding the cross section of thermoformable material at low pressures which comprises,
  a base platen and a top platen whose contact surfaces have a fusion point of $\geq 70°C$. and are adapted to bond to thermoformable material by hot tack adhesion, and
  one or both of such platens are adapted to vent air through a portion thereof during the expanding of the thermoformable material between the platens by pulling the platens apart while the thermoformable material is bonded thereto by hot tack adhesion,
  means to heat the platens to $\geq 70°C.$, and
  means to pull the platens apart while the thermoformable material is bonded thereto.

20 Claims, 26 Drawing Figures

INVENTOR.
WALTER H. SMAROOK

BY

ATTORNEY

INVENTOR.
WALTER H. SMAROOK

BY
James J. O'Connell
ATTORNEY

INVENTOR.
WALTER H. SMAROOK

BY

ATTORNEY

INVENTOR.
WALTER H. SMAROOK

BY

ATTORNEY

INVENTOR.
WALTER H. SMAROOK

BY James O'Connell

ATTORNEY

INVENTOR.
WALTER H. SMAROOK

BY

ATTORNEY

INVENTOR.
WALTER H. SMAROOK

BY James J O'Connell

ATTORNEY

MOLDING DEVICE

BACKGROUND OF THE INVENTION

1. Field of the Invention

The invention relates to a device for shaping fused thermoplastic material.

2. Description of the Prior Art

Most devices which are used for the shaping of fused thermoplastic materials require the use of high pressure for the shaping operation. Because of the need for such pressures, and the provision for molding cycles in such devices, the devices are highly complex pieces of machinery. Notwithstanding the complexity of such devices, they are ususally not able to provide, in a single molding step, shaped articles having expanded cross-sections of complex geometries such as honey-comb type geometries.

SUMMARY OF THE INVENTION

A device is provided for shaping fused thermoplastic materials at low pressures so as to provide articles with expanded cross-sections having complex geometries. The devices comprises a pair of platens whose contact surfaces have a fusion point of $\geq 70°C$. and which are adapted to bond to thermoformable material by hot tack adhesion, and one or both of the platens are adapted to vent air therethrough during the expanding of the thermoformable material between the platens by pulling the platens apart while the thermoformable material is bonded thereto by hot tack adhesion. Means are also provided for heating the platens to $\geq 70°C$. and for pulling the platens apart while the thermoformable material is bonded thereto.

An object of the present invention is to provide a device for shaping thermoformable materials at low pressures and essentially in a single forming step.

A further object of the present invention is to provide a device for expanding the shape of thermoformable materials so as to provide shaped objects having complex cross-sectional geometries in a single forming operation.

A further object of the present invention is to provide a device for expanding the cross-section of thermoformable materials without the use of blowing or foaming agents so as to provide shaped articles having a variety of expanded, lightweight, cross-sectional geometries.

Another object of the present invention is to provide a device for forming, from thermoformable materials, and in a single shaping step, expanded structures having perforations in the faces thereof, which perforations have undercut lip members around the periphery thereof.

Another object of the present invention is to provide a device for expanding, in a single shaping step, the cross-section of thermoformable materials so as to provide such cross-section with a predetermined pattern of regularly shaped and spaced voids.

DEFINITIONS

With respect to the herein provided description, examples and claims relating to the present invention the following definitions apply:

"Thermoformable" means that the thereby described material is a solid at 25°C. which can be reshaped or reformed above some higher temperature.

"Thermoplastic" means that the thereby described material is a solid at 25°C. which will soften or flow to a measurable degree above some higher temperature.

"Thermoset" means that the thereby described material is a solid at 25°C. which will not soften or flow, or cannot be reformed, at any higher temperature.

"Crystalline" means that the thereby described polymeric material exhibits a definite X-ray pattern for at least 50 percent of its polymeric structure when subjected to X-ray analysis.

"Amorphous" means that the thereby described polymeric material is devoid of a definite X-ray pattern for more than 50 percent of its polymeric structure when subjected to X-ray analysis.

"$Ta$" means the temperature at which a thermoplastic material exhibits hot tack adhesion.

"$Tm$" means, with respect to a crystalline polymer, the melting point of such polymer.

"$Tg$" means, with respect to an amorphous polymer, the temperture at which such polymer changes from a brittle to a rubbery condition. In a crystalline polymer it is the temperature at which the polymer becomes glassy, or the crystallinity disappears.

"Plastic" means a natural or synthetic resin.

"Normally solid" means solid at 25°C.

"Wet" or "Wetting" means the relative ability of one material to achieve interfacial contact with another material.

"Hot tack adhesion" means the ability of one material to exhibit adhesion to a second material while the first material is in a molten state, above its $Tm$ or $Tg$.

"Fusion point" means a temperature at which a material softens or melts.

"Cohesive Flow Property" means the property of a material in the molten state to be so readily distorted by external forces that the geometric cross-sectional area of such material will change substantially under such forces.

"Heat Distortion Point" means the temperature of a material as measured by ASTM D-648.

Most thermoformable materials have a $Ta$, i.e., a temperature at which they will exhibit hot tack adhesion to other materials. In the case of crystalline polymeric materials this Ta occurs about 5° to 10°C. above the $Tm$ of such polymeric materials.

In the case of amorphous materials the Ta varies considerably, depending on the structure and molecular weight of the material. For the amorphous polymers, therefore, the Ta may be about 30° to 150°C. above the Tg of such polymers.

The $Tm$ or $Tg$ will also vary for a given polymeric backbone, depending on the molecular weight and density of the polymer.

The following is a listing of various polymeric materials which may be used in the present invention with a listing of their $Tm$ or $Tg$, and their $Ta$, in °C. The Ta values reported here were specifically determined with respect to the adhesion of the polymeric material to an aluminum substrate. Essentially the same Ta value will be obtained upon adhering the polymers to other substrates.

| Polymer | Tg | Tm | Ta |
|---|---|---|---|
| 1. polyethylene Density=0.96 M.I.=3–5 | — | 126 | 135–140 |
| 2. polyethylene Density=0.94 M.I=13–15 | — | 122 | 130–135 |
| 3. polyethylene | — | 100–108 | 120 |

| | | | |
|---|---|---|---|
| Density=0.924 | | | |
| M.I.=1.2 | | | |
| 4. polyvinyl chloride | >5 | — | 155 240 |
| of polymethacrylo- | | | |
| nitrile & styrene 5. Nylon-6 | 60 | 215–220 | 240 |
| 6. Nylon-6,6 | 65 | 260 | 270 |
| 7. Polycaprolactone | — | 58 | 60 |
| 8. Polyurethane (polyester) | — | 130–170 | 160–180 |
| 9. Polysulfone | 185 | — | 300 |
| 10. polypropylene | −5 to 0 | 165–170 | 170 |
| 11. polycarbonate | 150 | — | 225 |
| 12. polymethylmethacrylate | 90 | — | 160 |
| 13. polystyrene | 100 | — | 185 |
| 14. polystyrene | 100 | — | 180 |
| (impact grade) | | | |
| 15. polyacetal | −60 | 165 | 170 |
| 16. 90/10 mol % copolymer | 115 | — | 240 |
| of polymethacrylo- | | | |
| nitrile & styrene | | | |
| 17. 70/30 mol % copolymer | 50–60 | — | 120–130 |
| of polyvinyl alcohol | | | |
| and polyvinyl acetate | | | |
| 18. 94.2/5.7 mol % copoly- | −20 | — | 110 |
| mer of ethylene and | | | |
| ethyl acrylate | | | |
| 19. 91.8/8.2 mol % copoly- | 18 | — | 110 |
| mer of ethylene and | | | |
| acrylic acid | | | |
| 20. 82/18 wt % copolymer | −15 | — | 120 |
| of ethylene and vinyl | | | |
| acetate M.I.=2.3 | | | |
| 21. styrene-butadiene | 90 | — | 190 |
| copolymer | | | |
| 22. styrene-acrylonitrile | 100 | — | 190 |
| copolymer | | | |
| 23. hydroxy propyl | 100 | — | 110 |
| cellulose | | | |
| 24. (solution blend of) | 115–120 | — | 235 |
| polystyrene and | | | |
| polyphenyleneoxide | | | |
| 25. cellulose acetate | 170 | — | 180–190 |
| 26. acrylonitrile-butadiene- | 100–104 | — | 180 |
| styrene terpolymer | | | |
| 27. copolymer of ethylene | — | 98 | 130 |
| and Na salt of meth- | | | |
| acrylic acid | | | |

It has now been found that the cross-section of a thermoformable material may be readily expanded so as to provide a large variety of end use objects having a wide selection of expanded cross-sectional geometries by expanding the cross-section of a blank of such thermoformable materials in a device having mold plates which are adapted to cause the concurrent formation of one or more voids of reduced pressure within the expanding cross-section of such blank, and having venting means adapted to vent the voids during the expansion of such cross-section so as to equilibrate the pressure within the voids with the pressure outside the blank and thereby regulate the uniformity and integrity of the resulting cross-sectional geometry of the expanded blank. The expansion of the blank is conducted while the blank is heated so as to place the thermoformable material in a thermoformable state, i.e., the blank is heated to a temperature which is ≥ the fusion point of the thermoformable material. The thermoformable material is expanded and vented in the device of the present invention between a pair of separable, air permeable, mold plates, which mold plates are moved apart to effect the desired expansion and venting of the blank of thermoformable material, while the blank is attached to the surface of such mold plates, in one way or another as disclosed below, during the expansion operation.

Figure 1:
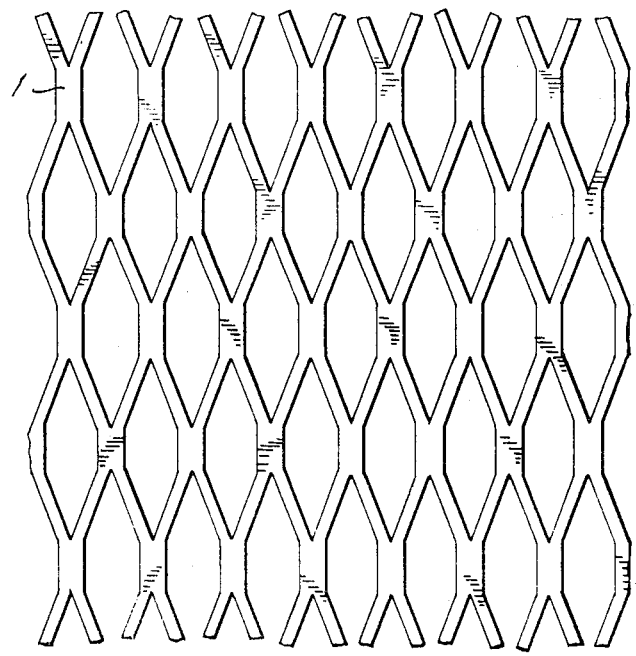
FIG. 1 shows a top view of a sheet of open mesh metal which may be used as a removable mold plate in the device of the present invention.

The use of the device of the present invention is based upon the property of various materials, and particularly thermoplastic polymeric materials, to exhibit hot-tack adhesion to practically all substrates at a temperature, $T_a$, which is usually above the $T_g$ or $T_m$ of the thermoplastic polymeric material. Thus, in a fused or molten state, the thermoplastic polymeric material will wet out practically all substrate surfaces and thereby impart adhesion thereto. In some cases this adhesion phenomena will be lost when the thermoplastic polymeric material cools below its $T_m$ or $T_g$.

Thus, if a blank of thermoplastic polymeric material is placed between two mold plates of a heated press so that the temperature of the mold plates is about 5° to 10°C. above the $T_a$ of the polymeric material in the blank, and the mold plates mechanically separated apart, the adhesive forces of the polymeric material to the surfaces of the mold plates are greater than the cohesive flow properties of the polymeric material itself during the plate separation or expansion step. As a result, it is possible to mechanically move the mold plates a certain distance apart with the polymeric material bonded to the surfaces thereof without causing a rupture of the adhesion between such surfaces and the fused material.

Although the mass of the expanded fusible material does not change, the cross-sectional configuration of the fusible material is expanded in the direction of the two separated plates as a result of the adhesive force of attraction between the fused thermoformable material and the surfaces of the plates. The extent to which the cross-sectional area of the fused material can be so expanded is thus primarily determined by the strength of the adhesive bond between the fused material and the surfaces of the mold plates, and the extensibility, in the molten state, of the thermoplastic resin in the blank. The stronger is such adhesive bond, the greater is the amount of cohesive flow that can be induced in the molten resin without a rupture of the adhesive bond occurring. The strength of the bond will thus depend on the nature of the thermoplastic resin in the blank, the nature of the mold plate materials, the extent of the surface area of the mold plate which is in contact with the fused blank and the cohesive strength and flow properties of the polymeric plastic.

Thus, the use as mold surfaces, of materials which are more readily wet by the fused plastic blank, will allow for a wider separation of the mold surfaces with the fused plastic bonded thereto, than would the use of mold surfaces made from materials which are not readily wet by the fused blank. Also, the use of the blank in the form of continuous sheet material will allow for the wetting with the blank of a larger amount of the surface area of the faces of the mold plates and thus allow for the attainment of greater adhesive forces between the fused blank and the mold plates.

As the mold plates are pulled apart with the heated thermoformable material bonded thereto, voids of reduced pressure are formed within the body of the expanding plastic. Thus, although the mass of plastic does not change, the volume of the expanding cross-section of the plastic does increase. The frequency of the occurrence of these voids, as well as their size and shape, i.e., the pattern of the voids, is largely determined by the pattern of the points or areas of contact which exist between the mold surfaces and the expanding plastic during the expansion process. In order to maintain the desired pattern of the voids, it is necessary to vent the voids during the expansion step as as to equilibrate the pressure within the voids with the pressure without the expanding material.

The pattern of the points or areas of contact between the mold surfaces and the thermoplastic blank can be readily varied. For example, the contact surfaces of the mold plates and/or the blank can be provided with various designs of recessed or raised surfaces so that when the contact surfaces of the mold plates and the blank are brought face to face, only the raised surfaces of the mold plates and the blank will actually contact each other. Another procedure for providing a pattern of points of areas of contact would be to use mold plates and blanks whose contact surfaces are in the form of a mesh, lattice or net work type of configuration. Thus, only the strands of the mesh, lattice, or network are available for contact purposes. The open areas in the mesh, lattice or net-work configurations would not provide surface contact between the mold plates and the blanks. These various types of surface designs in the mold plates and/or the blanks could thus provide at least some areas of contact between the surfaces of the mold plates and the surfaces of the blank. For example, where the blank is in the form of a sheet of material having smooth and flat contact surfaces, some areas of contact between the surfaces of the blank and the mold plates could be provided by using mold plates which have raised contact surfaces so designed as to provide only such raised surface area for contacting the surfaces of the blanks, or by using mold plates which have mesh shaped contact faces. Conversely, where the mold plates have flat smooth surfaces, the blank could be provided with the same selective type of raised or meshed surface areas which would provide the desired pattern of contact surface area.

The preferred means for providing the desired pattern of contact between the mold surfaces and the thermoplastic blank can be generally characterized as perforation means, and such perforation means are used to provide a pattern of individual and separate perforations at the interfaces between the top and bottom surfaces of the blank and the blank contact surfaces of the the two plates when the blank is inserted in the press between the two mold plates.

These perforations may be, at the plane of the interface between the mold plate and the blank, arcuate as in the shape of a circle or elipse, or angular, as in the shape of a triangle, rectangle, hexagon, or in the shape of a planar figure having both arcuate and angular sides, such as a hemisphere, or a section of a circle.

The perforations employed at each of the interfaces between the mold plates and the blank during the expansion of a blank are usually of the same size and shape, although they need not be. Different sized and/or shaped perforations may be used at one or both of the two interfaces.

In a preferred mode of operating the device of the present invention the blank of thermoformable material which is to be expanded is inserted between a pair of mold plates, one of which is positioned above the blank, and which may be termed the top or upper mold plate, and the other of which is positioned below the blank, and which may be termed the bottom or lower mold plate. In this embodiment the blank is expanded between the two mold plates in a vertical plane or direction. The blank, however, may also be expanded in a horizontal plane or direction by positioning the two mold plates at either side of the blank and otherwise conducting the process as in the manner of the vertical expansion process. In such a horizontal expansion process one of the mold plates could be characterized as the bottom mold plate, and the other the top mold plate.

The perforation means which is used at the interface between the top mold plate and the top surface of the blank may be termed the upper perforation means, and the perforation means which is used at the interface between the bottom mold plate and the bottom surface of the blank may be termed the lower perforation means. In a preferred embodiment of the device of the present invention the perforations in the upper perforation means are not aligned, in the vertical plane, with the perforations which are in the lower perforation means. That is, the perforations in the upper perforation means are either not of the same size of shape as the perforations in the lower perforation means, of if they are of the same size and shape, the pattern of the perforations in the upper mold plate is so positioned or arranged so that, in the vertical plane, there is, at most, only a partial alignment of any one perforation in the upper perforation means with any one perforation in the lower perforation means. The two perforation means can thus be so designed and positioned that there is no overlap at all, in the vertical plane, between any one perforation in the upper perforation means and any one perforation in the lower perforation means. In a preferred embodiment of the device of the present invention, however, the two perforation means are so designed and positioned that each perforation in each of the perforation means overlaps, in the vertical plane two or more perforations in the other perforation means.

In another preferred mode of operating the device of the present invention the pattern of the areas of contact between the surfaces of the blank and the surfaces of the mold plates is provided by using, as the bottom plate and the top plate, perforated plates as the perforation means. The perforated plates will only provide contact with the surfaces of the sheet facing such plates at the non-perforated area of such plates.

The desired pattern of contact areas can also be supplied to the contact surfaces of the two mold plates or the blank with other perforation means. A negative of the desired pattern can be used as such other perforation means and it can be affixed to the contact surface of the sheet which is to contact the mold plates or affixed to the contact surface of the mold plates themselves. in the form of masking means, such as cut-outs in circular, elliptical, hexagonal, rectangular, triangular, etc., form of masking tape, kraft paper, "Mylar film" or other materials which will prevent the fused thermoplastic material from adhering to the surface of the mold plates. Thus, the fused plastic will only be allowed to adhere to the surfaces of the mold plates at those areas of contact between the surfaces of the mold plates and the sheet where there is no masking means present.

These "negatives" thus function, when used as perforation means in the device of the present invention, in a manner of procedure which is directly opposite to that of the perforated mold plates, the use of which as perforation means is discussed above. These "negative" perforation means thus prevent contact at the interface between the surfaces of the blank and the contact surface of the two mold plates at those places at the interface where such "negative" perforation means are present. The use of the perforated mold plates, on the other hand, provides a lack of contact at such interface where the blank contact surfaces of the mold plates are not present, i.e., at the areas of the interface adjacent the perforations in the mold plates. Each of these two types of perforation means, does, however, function in the same basic manner, that is, each provides a pattern of perforations in the interface between the contact surfaces of the mold plates and the surfaces of the blank.

Thus, it may be said that the cross-sectional geometry of the expanded blank is a function of the design of the areas of contact which is provided in the contact surfaces of the mold plates, or the surfaces of the negative perforation means, and which is to contact the blanks. It is such design which determines the extent to which the contact surface areas of the perforation means and the blank are kept in contact during the expansion step in the process of using the device of the present invention, and the extent of such contact areas is what determines the pattern of the voids or cells in the expanding blank or sheet, and thus, in the cross-sectional geometry of the resulting expanded blank.

The voids or cells created in the sheet during the expansion step are vented through one or both of the mold plates, or in the case of the use of a negative perforation means, the voids or cells are vented from the outside of the blank and between the negative and the mold plate. Venting of the negative perforation means may also be accomplished by providing a vent hole over the negative perforation means wich vent hold would be vented through the mold plate to the atmosphere.

The speed with which the mold plates are moved apart during the expansion of the blank is not critical. The speed to be used is governed by the cohesive flow properties of the thermoformable material used in the fused blank. Where the blank is used in the form of a sheet having thicknesses of the order of about 10 to 300 mils, such blanks may be expanded $\geqslant$ 2 to 20 times such thicknesses according to the present invention by expanding the fused blank at a rate of separation of the mold plates of about 10 to 150 mils per second.

The amount of pressure used to pull the plates of the press apart in the process of the present invention is about 1 to 10 pounds per square inch of continuous surface area on the blank contact surface of the plates.

After a desired separating distance has been achieved, the expanded blank is cooled, to a temperature below the heat distortion point of the plastic, the press is opened and the expanded blank is removed therefrom. At this point the expanded blank may or may not continue to adhere to the surfaces of the mold plates, depending on the nature of the mold surfaces and the polymeric materials, as will be discussed below.

The expanded blank is cooled to a temperature below its heat distortion point, before being removed from the press so as to freeze, so to speak, the configuration of the expanded blank, and thus prevent distortion of such configuration.

Thus, a preferred device of the present invention for expanding the cross-section of a blank of thermoformable material therein comprises a pair of perforation means, wherein each of the perforation means provides perforations adjacent the interface of contact between the perforation means and the blank, and wherein the perforations in each perforation means are not aligned with the perforations in the other perforation means, and wherein venting means are provided to vent voids arising in the blank during the expansion thereof. The expansion of the blank in such device is also attended or accompanied by the formation of one or more voids of reduced pressure within the cross-section of the expanding blank, with the pattern of the occurrence of such voids being in response to the pattern of perforations in the perforation means, and the voids are vented during the expanding of the blank through the venting means so as to equilibrate the pressure within the voids with the pressure without the blanks and thereby regulate the uniformity and integrity of the resulting cross-sectional geometry of the expanded blank.

The preferred perforation means are perforated mold plates and the blank is usually adhesively bonded, and preferably by hot tack adhesion, to the non-perforated surfaces of such perforated mold plates during the expansion or pulling process.

In the preferred mode of operating the device of the present invention using two perforated mold plates the alignment of the perforations in the two mold plates is such that there results in there being, during the expansion process, an overlap by the perforations in each of the mold plates with respect to at least one, and usually two or more, of the perforations in the other mold plate. This overlap occurs in the vertical plane where the mold plates are used one over the other and they are expanded in a vertical direction; or in the horizontal plane where the mold plates are used on either side of the blank, and the mold plates are expanded in a horizontal direction. The venting of the voids is readily accomplished through the perforated mold plates.

The mold plates which are to be used may be disengageable from the device used to move them apart during the expansion step of the process described above. One or both of the mold plates can also be more permanently affixed to such device, in which case, the cooled, expanded thermoformable material is then removed from the device and the mold plate(s) affixed thereto.

When the expanded blank is cooled below its $Ta$, or even below its $Tm$ and/or $Tg$, it will not necessarily, in all cases, automatically lose its adhesion to the surfaces of the mold plates. The expanded blanks which are made of materials which are non-polar in nature, such as the polyolefin resins, will generally readily lose their adhesion to the surfaces of all of the types of mold plates which may be used in the device of the present invention, and which are listed below in more detail. The expanded blanks which are made of polar materials, i.e., materials comprising compounds which possess an electric moment, such as polysulfone resins and resins containing carboxyl, hydroxyl and ester groups, will tend to remain bonded to the surfaces of most, if not all, of the mold plates which may be used. However, even where adhesion between the expanded blank and the mold plates is not automatically lost upon cooling the expanded blank, the cooled expanded blank, can, where desired, be mechanically stripped from the mold plates without disrupting the integrity or configurations of the expanded blank. The tendency of both the polar and non-polar types of materials, to continue to adhere to the mold plates after the expanded blank made therewith is cooled below its heat distortion point can be enhanced by using mold plates which have roughened contact surfaces. The rougher is such contact surface, the better will be the adhesive bond with the cooled plastic.

In addition to the use of hot tack adhesion, other means may be used for affixing the thermoformable material to the mold plates during the expansion of the cross-section of the thermoformable material. In one such other procedure the thermoformable material may be loaded with a filler which is susceptible to being magnetized such as, powdered iron and barium ferrite, and the thus filled thermoformable material may be affixed to the mold plates during the expansion step, in any desired pattern of points or areas of contact therebetween by applying a magnetic field to selected portions of the contact surfaces of the mold plates. The thermoformable material may also be affixed to the surfaces of the mold plates during the expansion step by the application of electrostatic forces between the expanding thermoformable material and selected contact areas of the surfaces of the mold plates. Regardless of the means used to affix the thermoformable material to the mold plates during the expansion step, the thermoformable material must be heated to a fused or molten state during the expansion step.

A better understanding of the device of the present invention and its use can be obtained from the process sequence illustrated in FIGS. 1 to 5 of the drawings.

FIG. 1 shows a top view of a type of mold plate 1 which may be used in the device of the present invention. Mold plate 1 is an expanded steel mesh with a diamond shaped metal pattern. The pattern of the steel mesh need not be diamond shaped, of course, it may have other open mesh configurations. It is the surfaces of metal mesh which provide the mold contact surfaces which will contact the blank of plastic.

Figure 2:
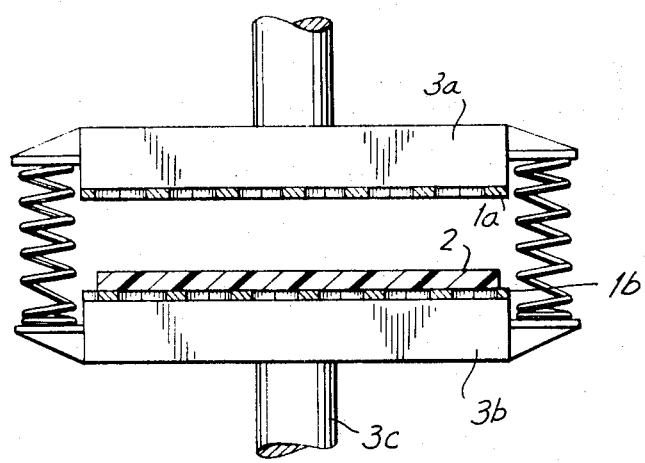
FIGS. 2–4 shows a sequence of steps involved in increasing the cross-sectional area of a blank of thermoformable material according to one embodiment of the present invention using two sheets of metal mesh as shown in FIG. 1 as removable mold plates in the device of the present invention.
Figure 3:
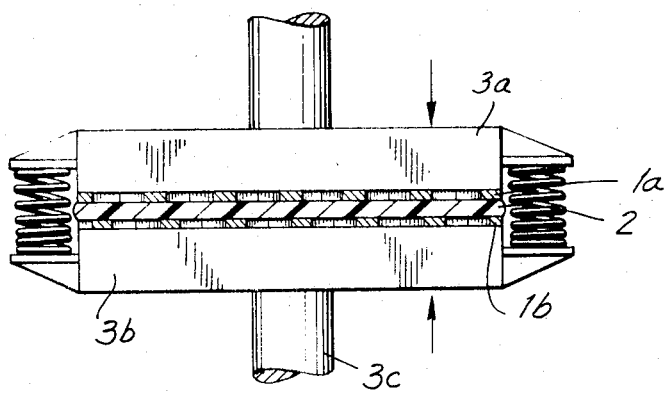
Figure 4:
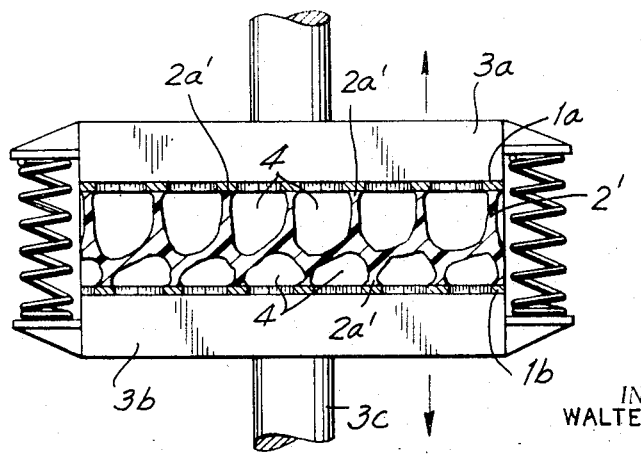

FIGS. 2 to 4 show a sequence of steps involved in using mold plate 1 according to one modification of the device of the present invention. In FIG. 2 there is shown a blank 2 of thermoformable material having a $Ta$, in the form of a smooth surfaced sheet of such material, which is inserted between the open platens, 3a and 3b, of a Carver press. To the faces of each of platen 3a and 3b of the press there is attached a metal mesh mold plate. In the embodiment shown, the contact points or areas of the top mold plate 1a are not vertically aligned with the contact points or areas of the lower mold plate 1b. In other embodiments such upper and lower contact points or areas can be vertically aligned. The mold plates 1 are heated, for the purposes of the present invention, to a temperature which is about 5° to 10°C. above the $Ta$ of the blank 2. The mold plates may be heated before, preferably, or after the blank is inserted in the press, and they are preferably heated conductively through platens 3a and 3b.

The Carver press described herein is a 20 ton hand operated hydraulic ram 3c which actuates a movable 6 × 6 inches lower platen 3b again a fixed upper platen 3a. In other devices or presses, the upper mold platen can be movable with the lower platen fixed, or both platens can be movable. The platens are usually heated electrically. Although the Carver press is the preferred means for bringing the heated mold plates into contact with the blanks, according to the present invention, other suitable platen moving means may be used, such as heated continuous belts.

The device of the present invention may be adapted to be used continuously or discontinuously. Using platen moving means such as the Carver press, a device may be adapted to be used discontinuously. A device may be adapted to be used continuously by using, as the mold plates, a pair of heated continuous converging belts of materials suitable as mold surfaces.

FIG. 3, shows the press after it has been closed with sufficient pressure to cause the top and bottom mold plates to exert a slight pressure on blank 2 so as to cause the heated blank to wet the surfaces of mold plates 1a and 1b which come in contact with the blank. The amount of pressure required for this step is of the order of about 1 ounce to 4 pounds per square inch. The pressure causes the blank to be slightly compressed.

FIG. 4 shows the platens pulled apart after the expansion step, with the expanded blank 2' adhering to points or areas of contact with plates 1a and 1b.

During the expansion step, as will be discussed in more detail below, areas of reduced pressure or cells 4 arise within the cross-section of the expanding blank. The side walls of the individual cells 4 are defined by rib-members 2'a of the expanded blank. The limits of cells 4 are defined by the contact points or areas of plates 1a and 1b and side walls 2'a. The reduced pressure in cells 4 is caused by the fact that each cell 4 tends to become a sealed chamber when the blank 2 fuses to contact mold surfaces of plates 1a and 1b and, as the mold surfaces are pulled apart, the sealed cells 4 become enlarged, thus creating areas of reduced pressure. To prevent the higher ambient pressures from distorting or rupturing expanded walls 2'a of the blank, cells 4 of the blank are vented during the expansion step so as to equilibrate the pressure within such cells 4 with the ambient pressure outside the blank. This venting tends to preserve the pattern and the integrity of the resulting cross-sectional geometry of the expanded blank. In this embodiment of the present invention, the venting is accomplished through the open mesh configuration of the mold plates, which functions as a perforation means, and the imperfect seal that exists between the surfaces of platens 3a and 3b and mold plates 1a and 1b.

After the platens have been expanded the desired distance they are cooled with cooling means to a temperature which is below the heat distortion point of the plastic in the blank. The cooling may be allowed to occur in the ambient air, or by circulating a cooling medium through the platens, or by conduction through cooled platens, or in some cases by a liquid coolant spray, or by a combination of such procedures.

The mold plates may be readily disengagable from the rest of the press so as to allow another set of mold plates to be inserted and used in the press with another blank of thermoformable material while a previously used set of mold plates having an expanded blank therebetween is allowed to cool. The mold plate should also be disengagable from the rest of the press where the nature of the fusible blank and of the mold plate is such that the cooled expanded blank remains bonded to one or both of the mold plates. In the latter case laminates may be readily formed with one or both of the disengagable mold plates as skin laminae and the expanded blank as a core lamina. When such laminates are desired, similar or dissimilar mold plates can be used so as to provide laminates with similar or dissimilar skin laminae, or even laminates wherein only one of the removable mold plates remains bonded to the cooled expanded blank.

Figure 5:
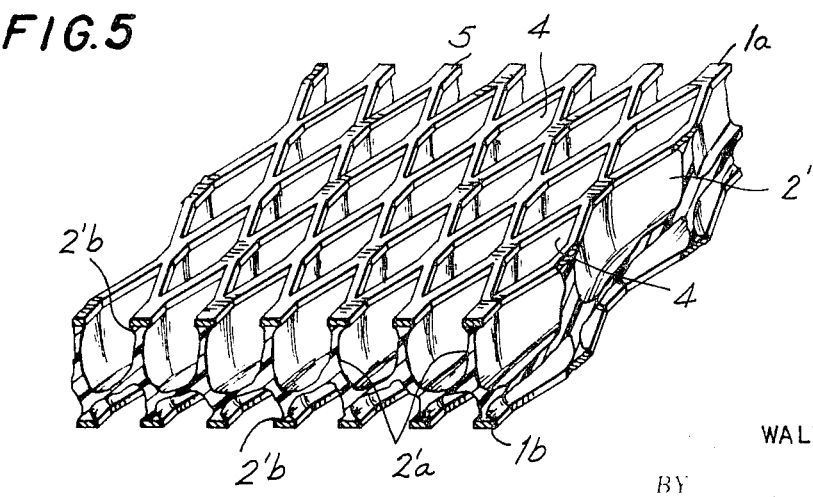
FIG. 5 shows an expanded structure made by the process disclosed in FIGS. 2–4.

FIG. 5 shows a cooled laminate structure 5 produced as described above with respect to FIGS. 1–4. The expanded and cooled plastic 2' remains bonded to plates 1a and 1b forming a rigid composite structural member 5. Rib members 2'a tend to have an I-beam configuration that has flanged members 2'b at the areas of contact with plates 1a and 1b. Expanded laminate structure 5 may be used as a relatively lightweight structural member as is, also the expanded core member 2' itself can be used as a structural member without the employment of metal plates 1a and 1b therewith.

For aesthetic, or other purposes, it may be desired to expand the cross-section of the blank in a non-uniform manner so as to provide expanded blanks which have cross-sectional areas of various degrees of thickness.

Figure 6:
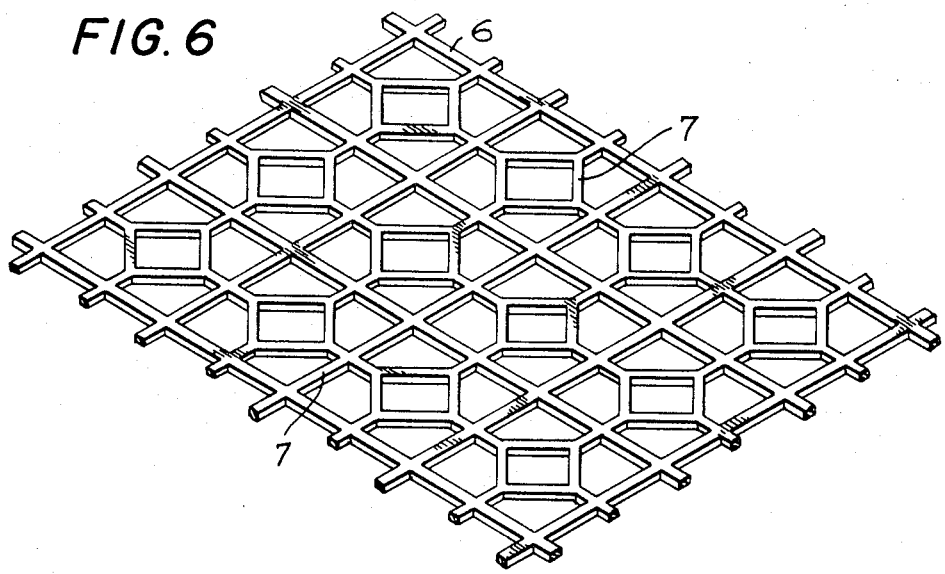
FIG. 6 shows a second type of removable mold plate having a perforated face which may be used in the device of the present invention.
Figure 7:
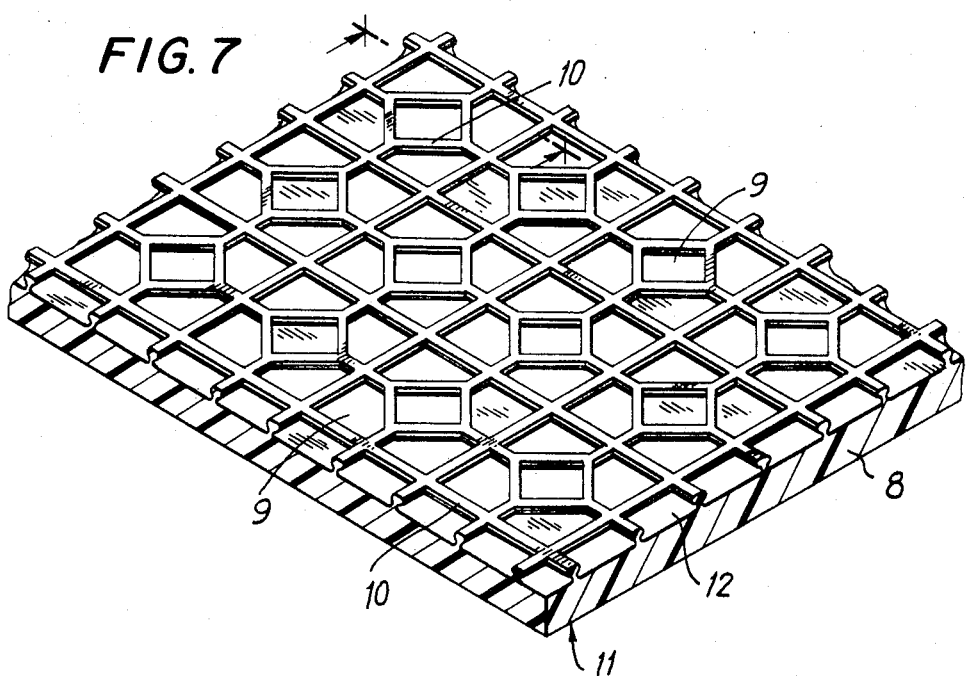
FIG. 7 shows an expanded structure made with one of the removable mold plates of FIG. 6 in the device of the present invention.

FIG. 6 shows another type of removable mold plate 6 which may be used in the device of the present invention, and FIG. 7 shows an expanded blank 8 which may be prepared with mold plate 6. Mold plate 6 as shown in FIG. 6, is a sheet of metal which has a pattern of holes punched therein, leaving a pattern of ridge members 7 in the surface of said platen. With the holes cut through mold plate 6, either side of the mold plate may be used for contacting the fused plastic blank in the device of the present invention.

Figure 8:
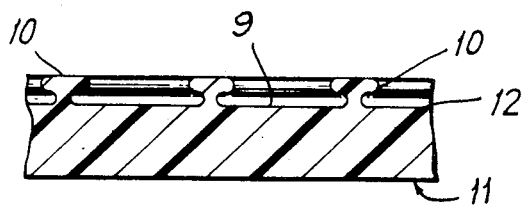
FIG. 8 shows an enlargement of the rib member of the expanded structure of FIG. 7.

In the preparation of the expanded blank 8 shown in FIG. 7, one removable mold plate 6 was used in a Carver press, in place of upper mold plate 1, as shown in FIG. 2. The mold plate 6 was mechanically affixed to upper platen 3a of the press. The flat surface of lower platen 3b of the press then served as the lower mold plate in this modification of the device of the present invention. In preparing expanded blank 8, upper mold plate 6 is contacted with fused blank 2 so as to cause the fused blank to wet, and adhere to by hot tack adhesion, the surfaces of ridge members 7 of the mold plate 6, and the flat surface of the lower platen 3b. When the platens 3a and 3b of the press are then opened during the expansion step, the lower contact face of the blank remains adhered to the continuous face of lower platen 3b, while the blank is expanded through adherence to mold plate 6 at points of contact with ridge members 7. During the expansion step, voids are created in the expanding blank adjacent the holes in the surface of mold plate 6. These voids result in the formation of recessed areas or cells 9 in the expanded blank 8 and are bounded by expanded rib members 10 of the expanded blank. The cells 9 are vented, during the expansion step, through the holes in the surface of mold plate 6 and between the surface of platen 3a and mold plate 6 so as to maintain the uniformity and integrity of the resulting cross-sectional geometry of the resulting expanded blank. Upon being cooled below its heat distortion point, the expanded blank 8 may be removed from the press and mold plate 6. Expanded blank 8, thus has a flat side 11 and an expanded side 12. The expanded ridge members 10 of expanded blank 8 form a mirror image of ridge members 7 in the surface of mold plate 6. As shown in FIG. 8, each of these expanded ridge members 10 tends to have an I beam configuration. This I beam configuration is common for most, if not all, of the expanded rib members which are found in all of the modifications of the expanded articles made with the device of the present invention.

In the preparation of expanded article 8 shown in FIGS. 7 to 8, ridge members 10 of expanded article 8 were expanded only a relatively short distance, so as to provide a type of embossed surface on the upper surface 12 of expanded blank 8. This embossing is not a true embossing, since the top surfaces of ridge members 10, as shown in FIG. 8, are undercut due to the I beam configuration of ridge members 10. This embossing effect can be used for decorative purposes on sheets of plastic intended for ornamental purposes or as a means of mechanically bonding or locking thereto other substrates or materials such as cement mortar, gypsum plaster or insulating bituminous cork mastic by means of the undercut features of the flanged tops of ridge members 10.

Ridge members 10 of expanded blank 8 can be further extended by pulling the mold plates further apart. The height to which ridge members 10 can be extended depends on several factors. Generally speaking, the height of ridge members 10 can be extended by increasing the surface area of the top surfaces of ridge members 10, which, in effect, is done by increasing the surface area of the contact surfaces of ridge members 7 of mold plate 6 shown in FIG. 6. Thus, ridge members 7 having larger surface areas will contact more of the surface of the blank to be expanded and thus allow more of the plastic in the blank to be pulled, during the expansion step, into the form of ridge members 10.

Figure 9:
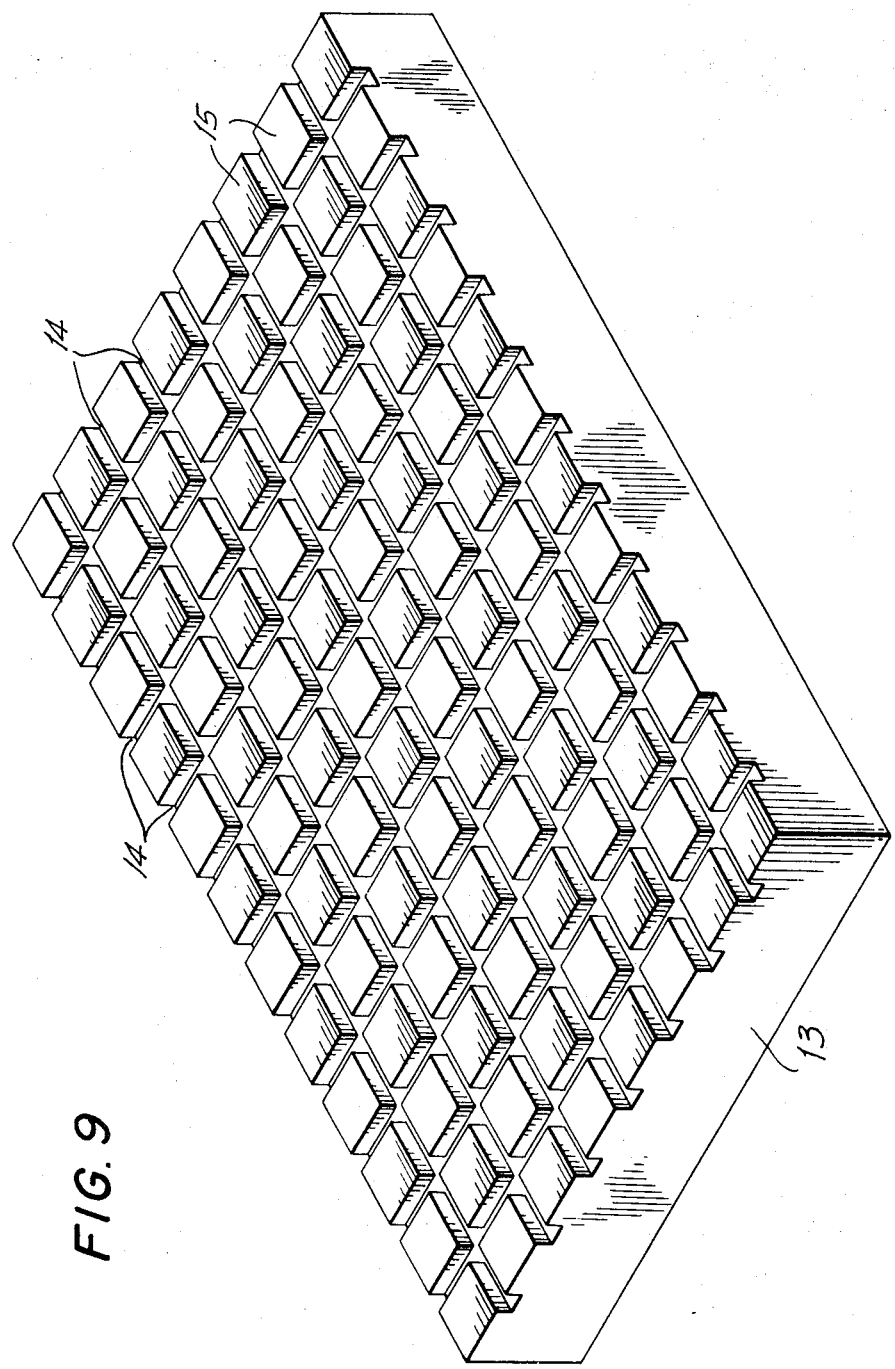
FIG. 9 shows a perspective view of another type of mold plate which may be used in the device of the present invention.

FIG. 9 shows a perspective view of a mold plate 13 which resembles the face of a waffle iron and may be used in the device of the present invention. Mold plate 13 has a series of interconnected recessed channels or grooves 14 cut into the top of such plate. Elevated areas 15 at the top surface of mold plate 13 are defined by the grid-like pattern of channels 14, and elevated areas 15 serve as the blank contact surface of mold plate 13. Channels 14 serve as channel means. The channel means need not be used in a grid pattern. The channel means can be a series of parallel channels or grooves running in one direction across the face of mold plate 13. In the mold plate 1 shown in FIG. 9 contact surfaces 15 comprise a series of aligned rows and columns of rectangles, with each rectangle being separated from the others by recessed channels or grooves 14 that run the length and width of the top surface of mold plate 13.

Figure 10:
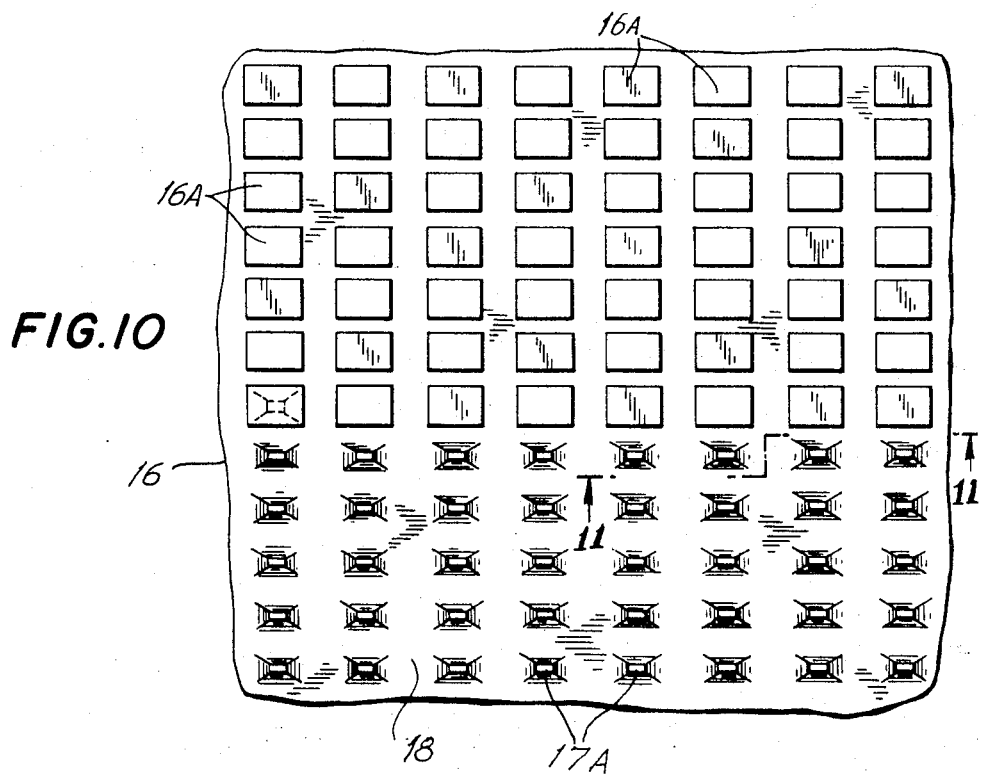
FIG. 10 shows a top view.
Figure 11:
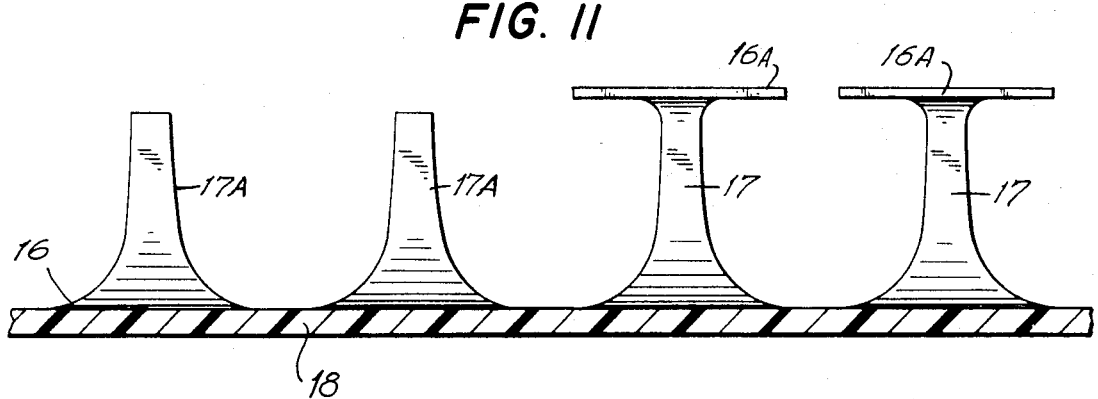
FIG. 11 shows a cross-sectional view of an expanded article made with the mold plate of FIG. 9.

FIG. 10 shows a top view, and FIG. 11 provides a cross-sectional view, of an expanded blank 16, which may be made with mold plate 13. Expanded blank 16 was made from a sheet of plastic using mold plate 13 as a top mold plate in a Carver Press, and the flat surface of the lower platen of the press as the lower mold surface. FIGS. 10–11 show expanded article 16 after the expanded article was removed from the press and subjected to a further process step as will be described below. The top view of expanded blank 16, as shown in FIG. 10, provides a partial replication of the pattern of contact surfaces 15 of the upper mold plate 13 of the press to which it adhered during the expansion step. This pattern is shown replicated in the pattern of columns and rows of rectangular shaped head members 16A depicted in the upper half of expanded blank 16 in FIG. 10. Each of these rectangles is the head 16A of an expanded I beam shaped rib member 17 as shown in cross-section in FIG 11. The base 18 of expanded blank 16 is a continuous film of plastic which forms the base for each and every rib member 17. During the expansion step in the process, the resulting voids, in the form of voids 18 between expanding rib members 17, are vented through the ends thereof, out the sides of the expanding blank.

After the expansion operation the head members 16A of some of the rib members 17 were removed so as to provide bristle like members 17A as shown in cross-section in FIG. 11.

In the expanded blank shown in FIGS. 10 to 11 all of the strand or bristle members 17 project from the same side of base member 18, although in other embodiments bristles can be provided on both surfaces of base member 18.

The expanded blank 16 shown in FIGS. 10 to 11 can be used for the preparation of bristled objects such as artificial turf, brushes, door mats, scraping devices and packaging or cushioning material.

Figure 12:
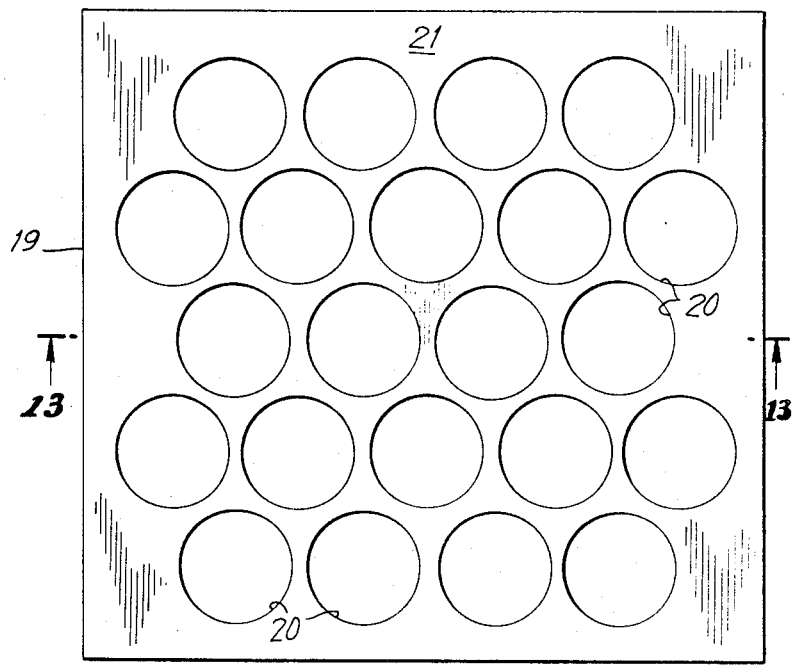
FIG. 12 shows a top view.
Figure 13:
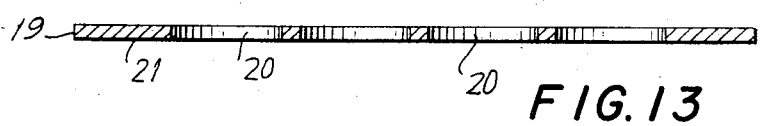
FIG. 13 shows a cross-sectional view, of a perforated mold plate that may be used in the device of the present invention.

FIG. 12 shows a top view and FIG. 13 shows a cross-sectional view of another type of perforated mold palte 19 which may be used in the device of the present invention. Perforated mold plate 19 is a thin sheet of material such as aluminum or steel in which a series of regularly spaced perforations 20 are punched, so as to provide a pattern of staggered rows and columns of such perforations. The perforations may have either or both of arcuate and straight sides. The perforations 20 in mold plate 19 are all circular in shape. Each of perforations 20 are the same size circular perforation, with the various perforations being separated from each other by the continuous portion 21 of the surfaces of mold plate 19. Perforations 20 function as a perforation means and the continuous surface 21 of mold plate 19 provides the mold plate contact surface which will contact surfaces of the blank during the expansion process.

Figure 14:
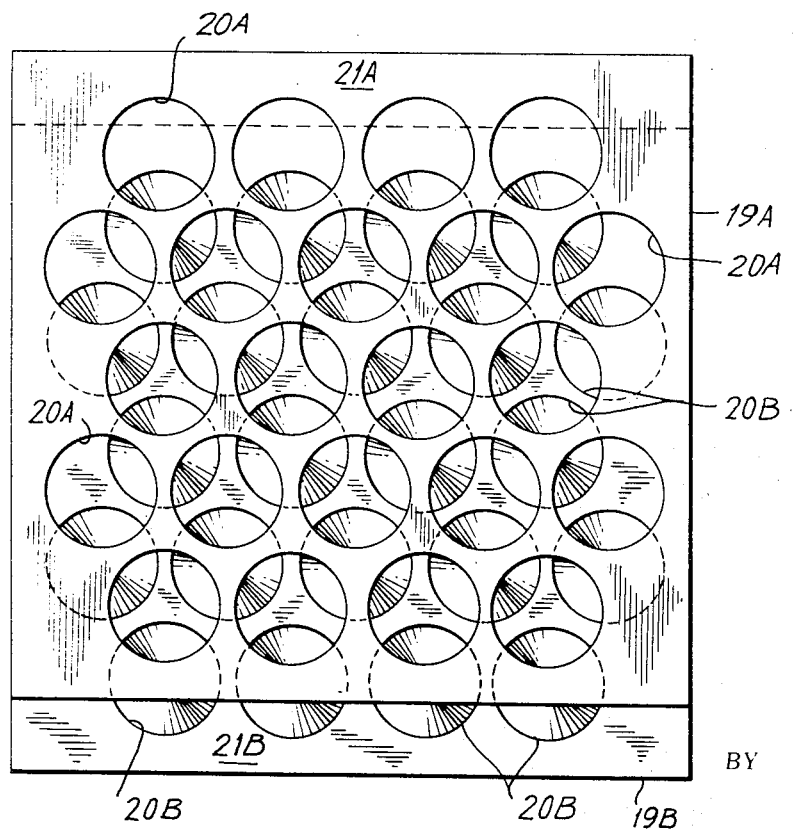
FIG. 14 shows two of the mold plates of FIGS. 12–13 in a non-aligned position for use in the device of the present invention.

FIG. 14 shows a top view of two mold plates 19, one positioned over the other. The position of the two plates with respect to each other, in the vertical plane, is such that the perforations in the two plates are not aligned. Thus each of the perforations 20A in the upper plate 19A overlap, in such vertical plane, one or more of the perforations 20B in the lower plate 19B. This pattern of overlap is occasioned by the size, shape and spacing (staggering) of the rows and columns of perforations in each plate, as well as by the positioning of one plate, in the vertical plane, with respect to the other. This same pattern of overlap will prevail in the horizontal plane, if the position of the two mold plates with respect to each other is maintained, and they are both stood side by side on one of their thin edged sides.

Figure 15:
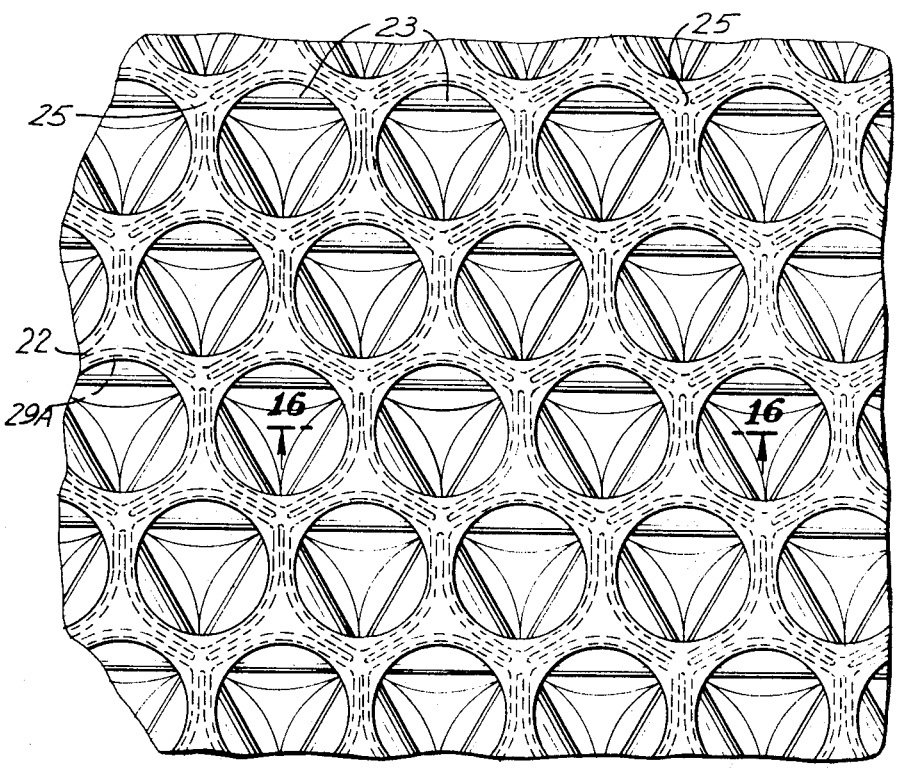
FIG. 15 shows a top view.
Figure 16:
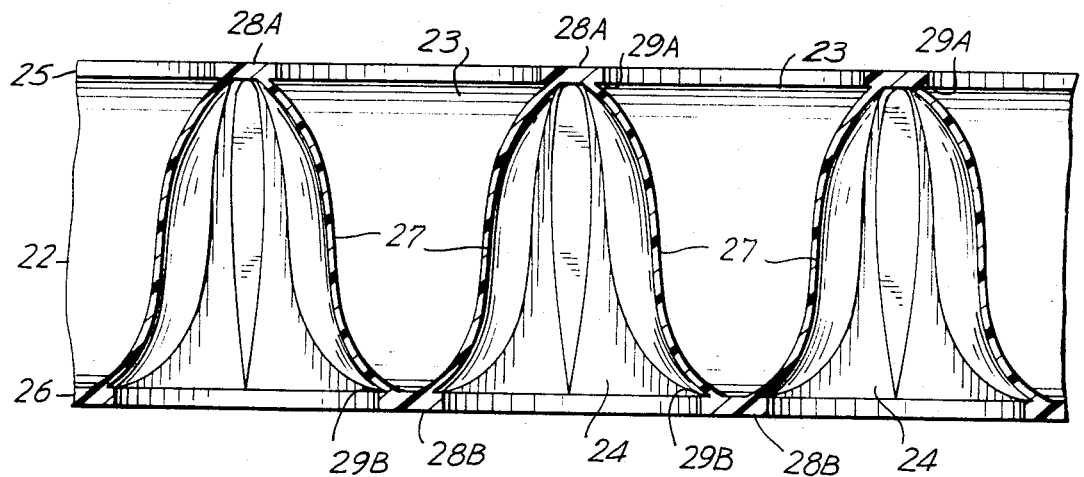
FIG. 16 shows a cross-sectional view of an expanded blank made with the non-aligned mold plates of FIG. 14.

FIG. 15 shows a section of a top view, and FIG. 16 shows a section of a cross-sectional view of an expanded blank 22, which has been produced by expanding a sheet of thermoplastic material between non-aligned mold plates 19A and 19B, as shown in FIG. 14, in a Carver Press. Expanded article 22 is shown after it has been removed from the press and the mold plates. Expanded blank 22 is a three dimensional article which has two sets of cells 23 and 34 therein. Cells 23 are open at the upper face 25 of article 22 and sealed at the lower face 26 thereof. Cells 24 are open at the lower face 26 of article 22 and sealed at the upper face 25 thereof. The upper and lower cells are separated by common wall members 27. The top face 25 of expanded article 22 provides a replication of the blank contact surface of upper mold plate 19A to which it adhered during the expansion step. Thus the open ends of upper cells 23 in article 22 replicate perforations 20 of mold plate 19A, and continuous portions or areas 28A of the top face 25 of expanded blank 22 replicate the continuous areas 21A of mold plate 19A. In a similar manner the continuous surface 28B of lower face 26 of expanded blank 22 provides a replication of the blank contact surface of lower mold plate 19B. As seen in FIG. 15, each of the circular open ends of upper cells 23 overlaps, in the vertical plane, about three of the circular open ends of the lower cells 24 in the expanded blank. FIG. 16 shows that side walls 27 of the cells tend to be rotund, rather than flat. FIG. 15 shows lip member 29A around the opening of each cell 23, and FIG. 16 shows lip members 29A and 29B at the openings of cells 23 and 24, respectively.

Figure 17:
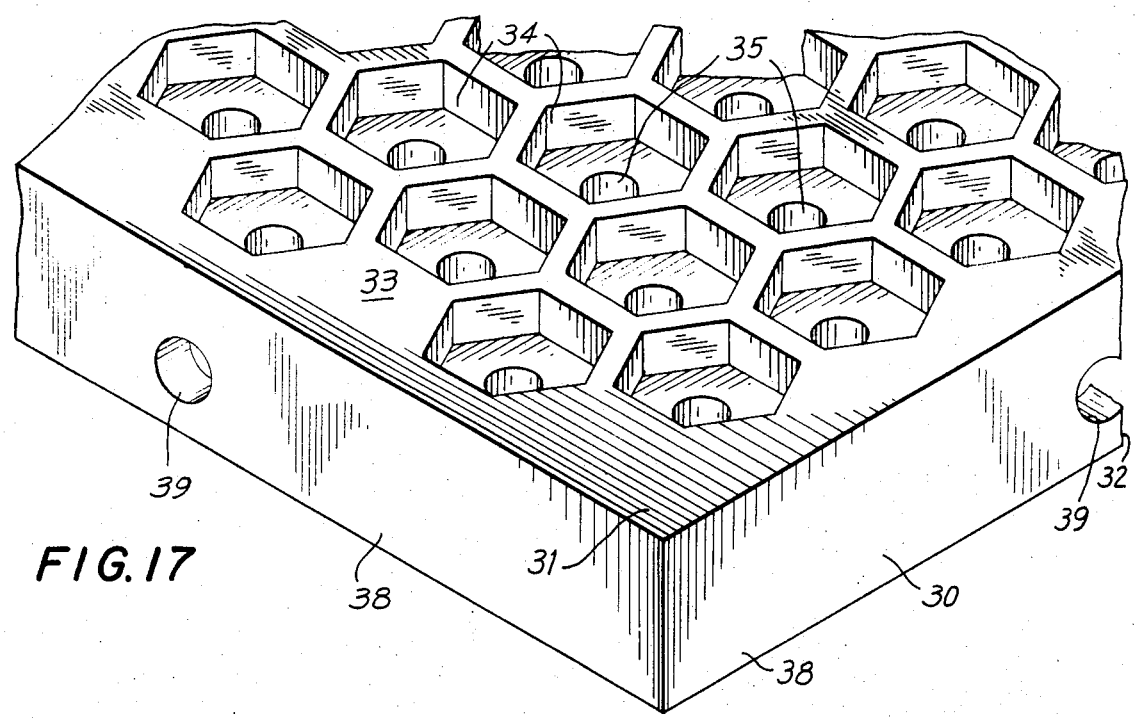
FIG. 17 shows a partial top view.
Figure 18:
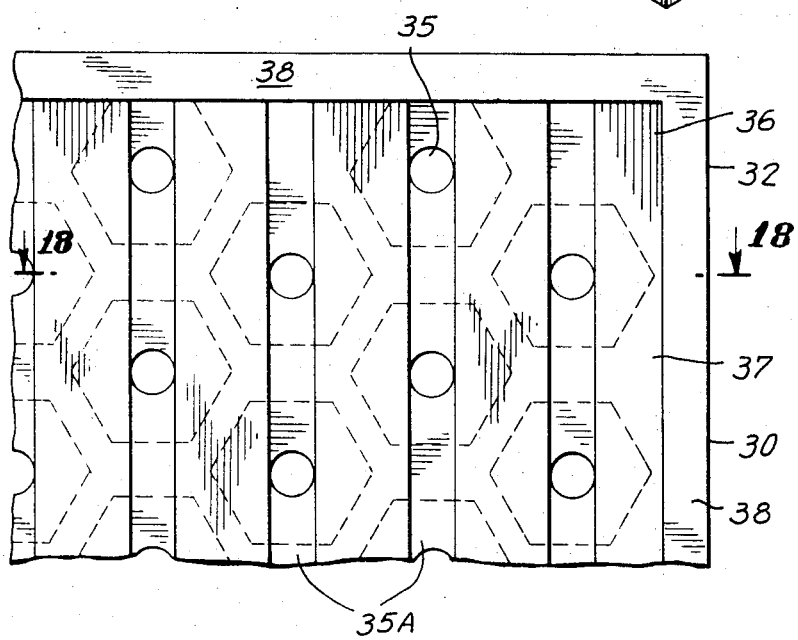
FIG. 18 shows a partial view of the reverse side.
Figure 19:
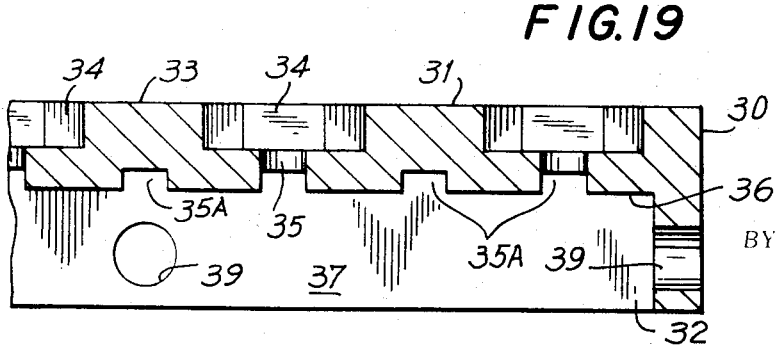
FIG. 19 shows a partial cross-sectional view of another perforated mold plate that may be used in the device of the present invnetion. invention.

FIG. 17 shows a partial top view, FIG. 18 shows a partial view of the reverse side, and FIG. 19 shows a partial cross-sectional view, of another type of mold plate 30 which has a series of recessed cavities therein as perforation means and which may be used as a perforated mold plate in the process of the present invention. Mold plate 30 has a top sheet 31 of metal mounted on a hollow U-shaped frame 32. In the front face 33 of the sheet 31 a series of regularly spaced and staggered rows of hexagonal shaped perforations 34 were machined. Each of the hexagonal perforations 34 was only machined about half way through top sheet 31. In the center of the base of each of the hexagonal perforations 34 there was then drilled a small circular vent hole 35 through the remainder of sheet 31 and which exited out the other (back) face 36 of sheet 31. the circular vent holes 35 were about a third of the diameter of the hexagonal perforations 34. The hexagonal perforations 34 were all the same size. Vent holes 35 open out the back face 36 of sheet 31 into a hollow area 37 bounded by the three legs 38 of U-shaped frame 32. Channels 35A are provided in the back-face 36 of sheet 31 to link each column of vent holes 35 to facilitate venting therethrough. Screw holes 39 are also provided in the walls of legs 38 for fastening mold plate 30 to the Carver press. Two of these mold plates 30 were used in a Carver press as described above to prepare the expanded blank shown in FIGS. 20–21. Venting of the back of the mold plate to the outside of the plate is accomplished through the open wall of U-shaped frame 38, which is not shown.

When inserted in the Carver press as the top and bottom plates thereof, the two plates 30 were positioned and aligned so that the two front faces 33 thereof faced each other and the hexagonal perforations 34 in the top plate were not completely aligned in the vertical plane, with the hexagonal perforations 34 in the lower plate. The hexagonal perforations 34 in the upper plate were positioned so that each of the perforations in the upper plate overlapped, in a vertical plane, two or more of the hexagonal perforations in the lower plate, as will be discussed in more detail below.

Figure 20:
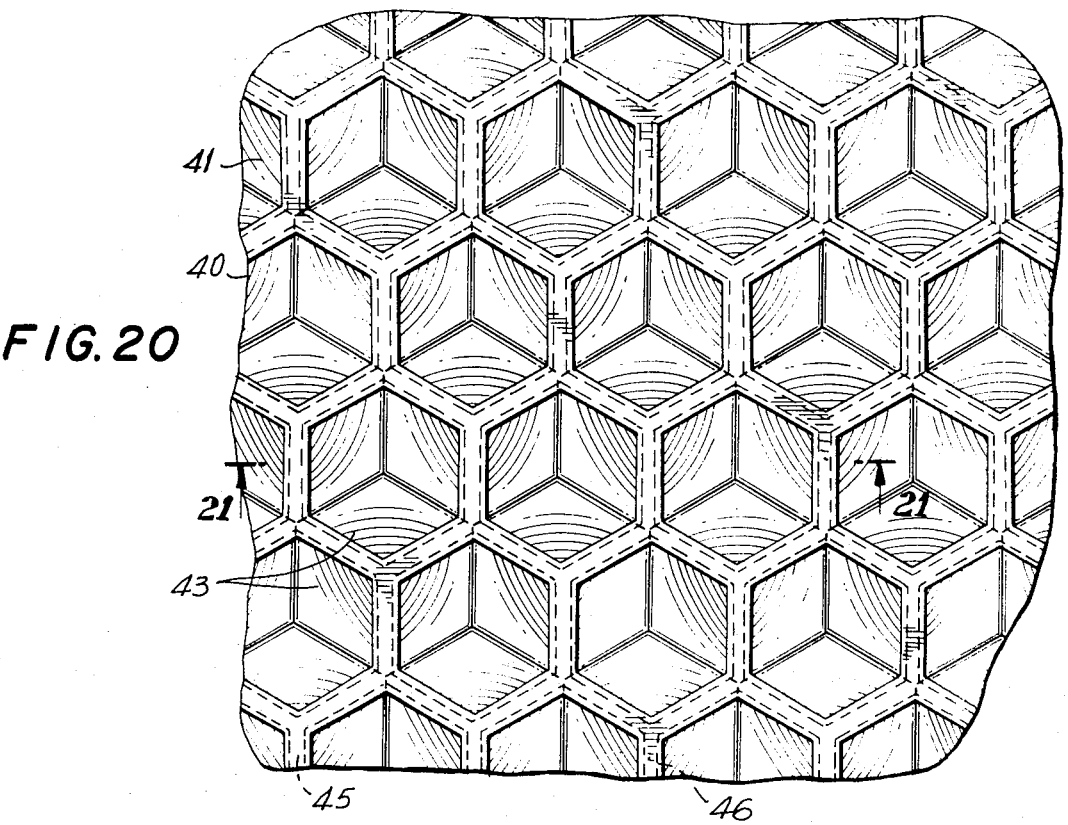
FIG. 20 shows a top view.

FIG. 20 shows a top view of expanded blank 40. The top face 41 of expanded blank 40 provides a replication of the perforated surface of the upper plate of the press to which it adhered during the expansion step. The lower face 42 of the expanded blank is a duplicate of such upper face 41 and provides a replication of the perforated surface of the lower mold plate of the press to which blank 49 adhered during the expansion step. FIG. 20 thus shows that the alignment and positioning in the press of the two mold plates 30 that were used to prepare expanded blank 40 was such that each horizontal row of perforations 34 in the upper mold plate was aligned, in a vertical plane, with two of the horizontal rows of perforations 34 in the lower mold plate in such a way that each of the perforations 34 in the upper mold plate overlapped three adjacent perforations 34 in the lower mold plate. Each of the perforations 34 in the lower mold plate was overlapped to the same extent, in terms of overlapped surface area. This can be accomplished by first aligning each horizontal row of perforations 34 in the upper mold plate with a horizontal row of perforations 34 in the lower mold plate, and then shifting the upper mold plate on its X axis, with respect to the X axis of the lower mold plate, so that each perforation 34 in the upper mold plate overlaps two adjacent perforations 34 in the lower mold plate, and then further shifting the upper mold plate on its Y axis, with respect to the Y axis of the lower mold plate, so that each perforation in the upper mold plate overlaps a portion of three adjacent perforations 34 in the lower mold plate, with such latter three perforations in the lower mold plate including the two perforations 34 in the lower mold plate that were overlapped in the first shifting step. The shifting of the two mold plates with respect to each other can be such that one or the other, or both of the plates are shifted in their X and/or Y axis with respect to each other to accomplish the desired overlapping of the perforations in the two plates. The sequence of steps involved in the aligning and shifting of the mold plates is not critical. This is accomplished before the blank is inserted between the aligned and positioned mold plates.

Figure 21:
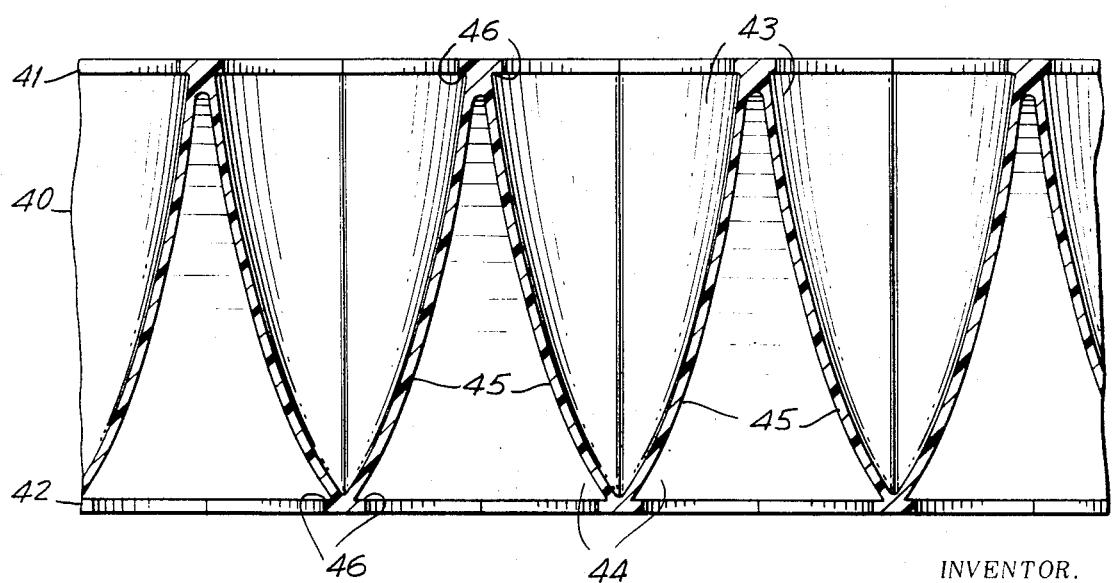
FIG. 21 shows a cross-sectional view of an expanded article made with two of the mold plates of FIGS. 17–19.

FIG. 21 shows a cross-section of expanded blank 40. Expanded blank 40 provides two sets of regularly shaped and spaced cells which are open at one end and sealed at the other end thereof. Each cell is conical in shape. As shown in FIG. 21 one set 43 of such cells is open at the upper face 41 of blank 40, and sealed at the lower face 42 thereof, and the second set 44 of such cells is open at lower face 42, and sealed at upper face 41. The cells are separated by I beam shaped rib members 45. The rib members 45 defining each cell join together in an apex at the base of such cell to form a sealed base. The tops and bases of rib members 45 provide the continuous portion of the perforated top face 41 and base 42 of expanded blank 40. Lip members 46 which are present around the periphery of each cell 40 and 44 are not too pronounced because of the relatively close spacing and alignment of the perforations in the plates with which expanded blank 40 was prepared, and also because the perforations were angular and not circular or arcuate.

During the expansion of the sheet of plastic to form expanded blank 40 cells 43 and 44 were vented, in turn, through the perforations 34, vent holes 35 and channels 35A and the open wall of U-shaped frame 32 in the upper and lower mold plates 30 of the press.

Figure 22:
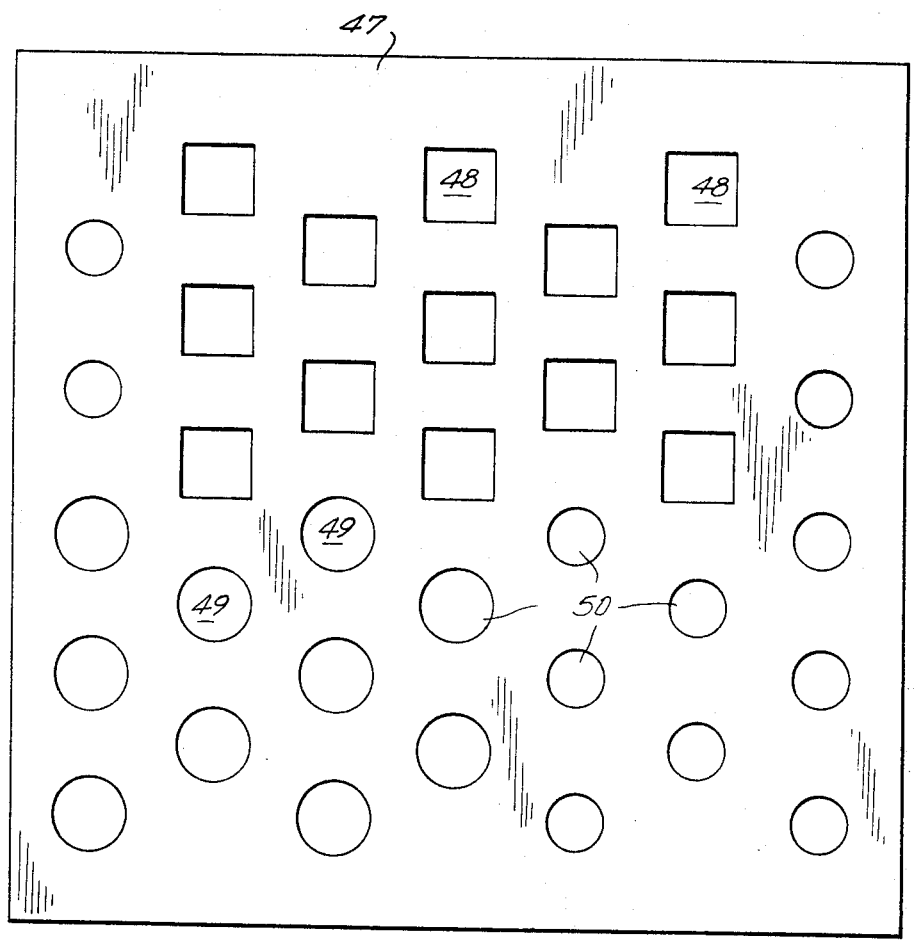
FIG. 22 shows a top view of another type of perforated mold plate, which has a plurality of different sized and shaped perforations therein, that may be used in the device of the present invention.

FIG. 22 shows a top view of another type of thin mold plate 47 which may be used in the device of the present invention. Mold plate 47 has a series of three different shaped or sized perforations punched therein, squares 48, large circles 49 and small circles 50. Squares 48 have a slightly larger surface area than circles 49, which have a larger surface area than circles 50. As shown in FIG. 22, all the perforations are arranged in ordered columns in one, or the vertical direction, and in a staggered array in the other, or horizontal direction. All of the squares are the same size, as are all the large circles, and the small circles.

Figure 23:
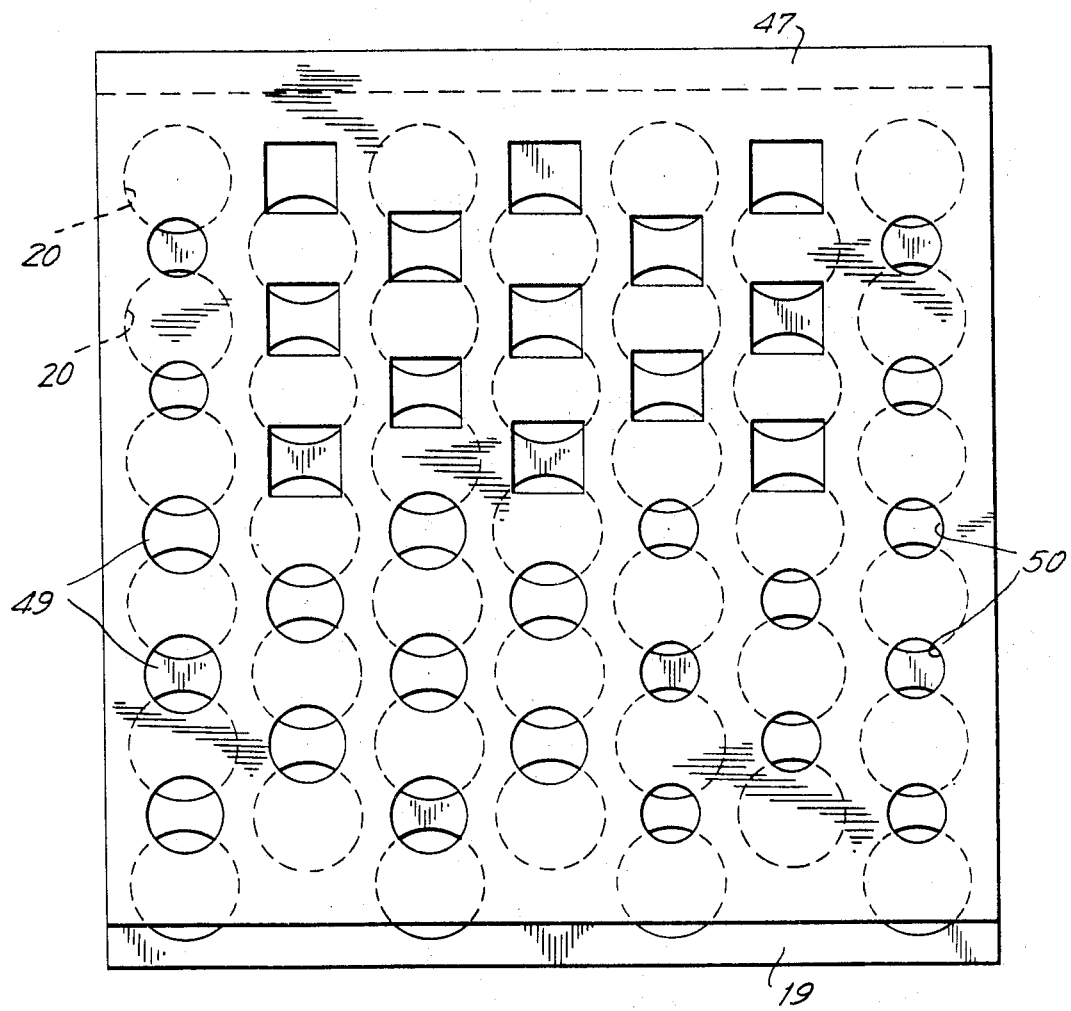
FIG. 23 shows a top view of two of the mold plates of FIG. 22, positioned one above the other, with a non-alignment of their perforations.

FIG. 23 shows, a top view of a mold plate 47 positioned above a mold plate 19 of FIGS. 12–13 in one alignment of such plates with respect to each other which may be used in the device of the present invention. In the alignment of mold plates 19 and 47 shown in FIG. 23, mold plate 19 is in position to be used as a lower mold plate, and mold plate 47 is in position to be used as an upper mold plate. The perforations 20 in lower mold plate 19 are all larger in area than any of the three perforations 48, 49 and 50 in mold plate 47. The distance between any two adjacent perforations in each vertical column of the perforations in upper plate 47 varies but is always less than the diameter of perforations 20 in lower mold plate 19, all of which perforations 20 have the same diameter. Each vertical column of perforations in upper mold plate 47 is aligned with a vertical column of perforations in lower mold plate 19, and in the vertical plane, each of the perforations 20 in lower mold plate 19 is overlapped with two of the perforations in upper mold plate 47.

Figure 24:
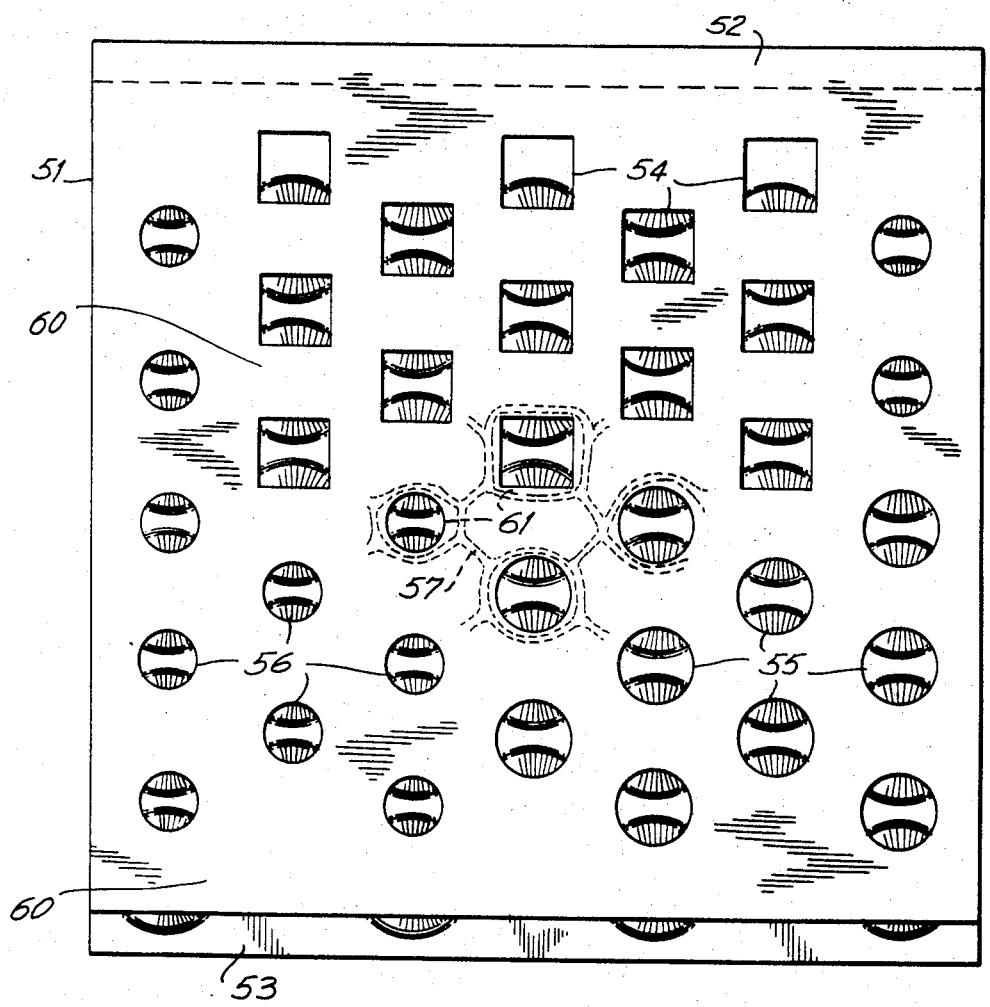
FIG. 24 shows a top view.
Figure 25:
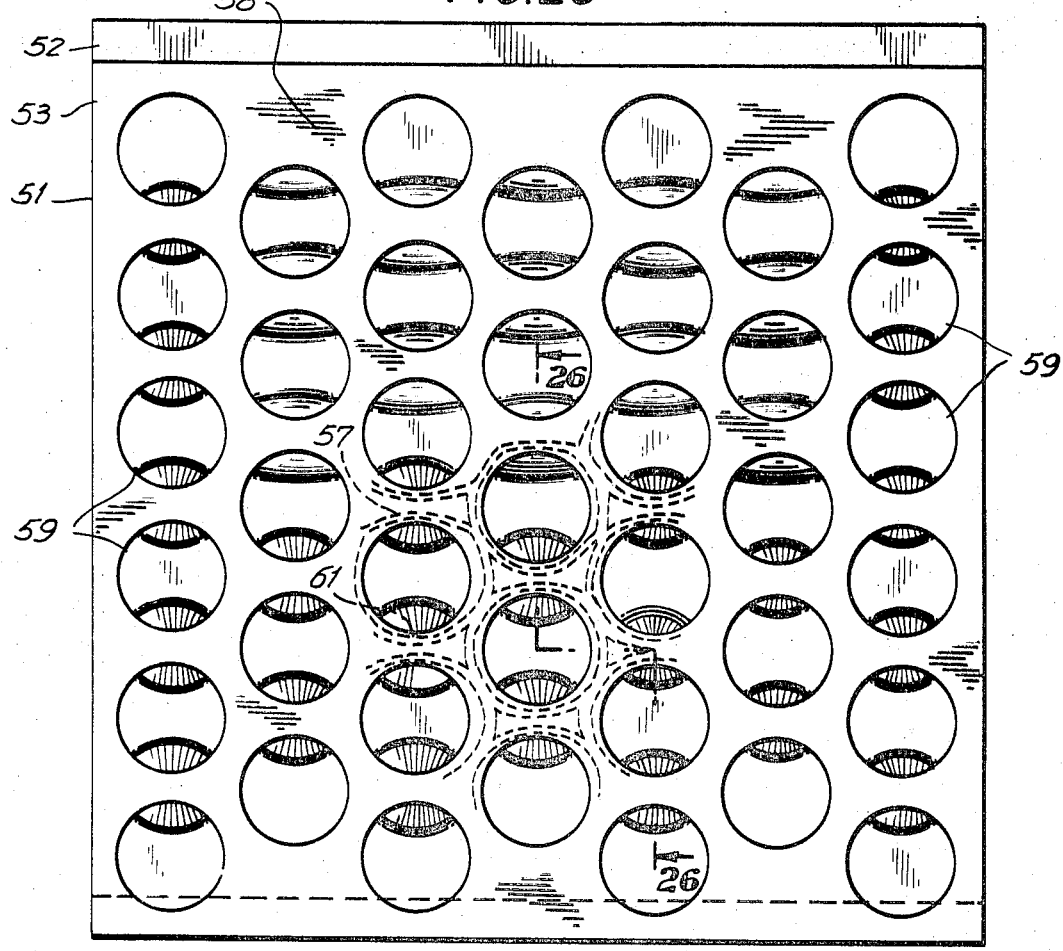
FIG. 25 shows a bottom view.
Figure 26:
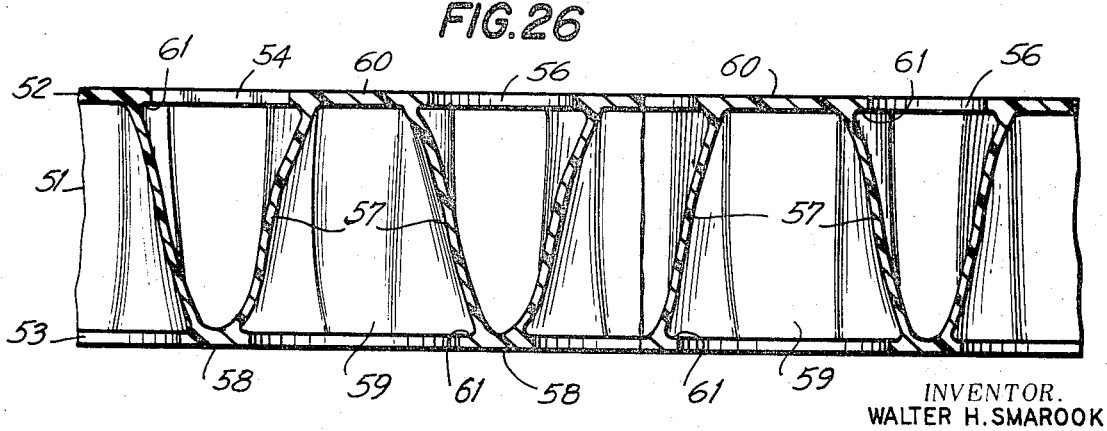
FIG. 26 shows a partial cross-sectional view, of an expanded article made with two of the mold plates of FIGS. 22 and 23.

FIG. 24 shows a top view, FIG. 25 shows a bottom view, and FIG. 26, shows a cross-sectional view, of an expanded blank 51 made with the aligned mold plates 19 and 47 as shown in FIG. 23. The expanded blank 51 shown in FIGS. 24–26 was thus prepared by expanding a sheet of plastic having a Ta, with the aid of hot tack adhesion as described above, between a pair of mold plates 19 and 47 arranged as shown in FIG. 23. The upper surface 52 of expanded blank 51 shows a replication of mold plate 47 to which it adhered during the expansion step. The lower surface 53 of expanded blank 51 shows a replication of mold plate 19 to which it adhered during the expansion step. Voids 54, 55 and 56 in upper surface 52 have the square, the larger circle and the smaller circle, respectively, shaped openings shown in surface 52 and are open at upper surface 52 and closed at sides 57 and bases 58 thereof. The sealed bases 58 of voids 54, 55 and 56 are formed by the continuous positions of lower surface 53. Voids 59, with circular shaped openings, are open at the face of lower surface 53 of blank 51 and are sealed at the sides 57 and apexs or tops 60 thereof. The sealed tops 60 of voids 59 are formed by the continuous portions of upper surface 52 of the blank.

The common side or rib members 57 of the voids or cells 54, 55 and 56 on the one hand, and cells 59 on the other hand, have an essentially I beam configuration. Each rib or wall member 57 forms part of the side of both a cell 59, and one or more of cells 54, 55 and 56.

Continuous lip members 61 which are present around the periphery of the openings of each cell 54, 55, 56, and 59 are more pronounced around the circular peripheries of cells 55, 56 and 59 than aound the rectangular periphery of cells 54.

Cells 54, 55, 56 and 59 are generally all of the same height but their volumes are of the order of 56<55<54<59, and the relative size of the volumes of such cells is a function of the relative size of perforations 50, 49, 48 and 20, respectively. Cells 54, 55 and 56 tend to be more conical in shape, than cells 59, whereas cells 59 tend to be more cylindrical in shape than cells 54, 55 and 56. The sealed ends of all of these cells, however, tend to be narrower than the open ends thereof.

During the expansion step in the process the resulting voids 54, 55, 56 and 59 are vented through the perforations 48, 49, 50 and 20, respectively, in the upper and lower mold plates, and also through the imperfect seal that exists between the surfaces of such mold plates and the surfaces of the upper and lower platens of the press to which the mold plates are affixed during the expansion process.

As seen in FIG. 24 the openings of upper cells 54, 55 and 56 are not aligned, in the vertical plane, with the openings of lower cells 59. Thus each of lower cells 59 are overlapped, in the vertical plane, by two adjacent cells 54, 55 and/or 56. This pattern of overlap in the cell openings, as seen in FIG. 24, is a replication of the pattern of overlap in the vertical plane of the perforations in the faces of the two mold plates 47 and 19 which were used as the upper and lower mold plates, respectively, during the preparation of expanded blank 51.

It can also be seen that about one-half of all the cells in the blank are cells 59 which are open at the lower face of expanded blank 51, and that the remaining cells are cells 54, 55 and 56 which are open at the upper face of blank 51.

For most of these end use applications of the expanded blanks it is desirable, as noted above, to so expand the blank so that the integrity of the I-beam shaped wall members that separate the cells in the expanded blank is maintained. That is, the vacuums that arise in these cells are vented to avoid rupturing such wall members. For some applications, however, it may be desirable to intentionally cause a rupturing of such wall members. This can be accomplished, even while venting the vacuums in the cells, by continuing to expand the blank to such an extent that the wall members become thinner and thinner and eventually rupture, leaving punctures therein. The punctures can thus be provided uniformly in one or more of the wall members in all of the cells. The expanded blanks made with such ruptured wall members can be used to allow the passage of liquids or gases therethrough in various applications, such as screens, trickle-tower filling and air vents. The ruptured walls can also be tolerated in containers where the side walls are not needed to cushion or separate fragile articles contained therein.

THE THERMOFORMABLE MATERIALS

The materials which may be employed in forming the expandable blanks which are to be expanded in the device of the present invention are normally solid thermoformable materials which have a Ta of about 50° to 300°C., and preferably of about 100 to 250°C.

If there is a difference of at least about 10°C. between the melting points of any two fusible materials that could be used as the mold plates, then the fusible material having the lower melting point could be used as a blank while the fusible material having the higher melting point could be used as the mold plate.

The blanks may be used in various forms such as sheet, netting and sheet with punched out designs. The fusible material used for the blank need not have any elastomeric qualities.

Fusible materials which might be used as blanks would include natural and synthetic thermoplastic resins and thermosetting resins, glass and low melting elemental metals and alloys and compounds thereof.

The natural resins would include materials such as asphalt, bitumen, gums, pitch and tar.

The synthetic resins would include the vinyl resins. These vinyl resins may be either homopolymers of an individual vinyl monomer or they may be interpolymers of one or more vinyl monomer and from 0 to about 50 mol percent of one or more non-vinyl monomers which are interpolymerizable with vinyl monomers. The term "vinyl monomer" means a compound which contains at least one polymerizable group of the formula

The vinyl polymers would thus include, for example, polyethylene, polypropylene, ethylene-propylene copolymers, polyvinyl chloride, polyvinylidene chloride, polyvinyl fluoride, polystyrene, styrene-butadiene-acrylonitrile terpolymers, ethylene-vinyl-acetate copolymers, ethylene-acrylic acid copolymers, ethylene-acrylonitrile copolymers and styrene-acrylonitrile copolymers.

In addition to the vinyl polymers, other polymeric materials which may be used in the device of the present invention include thermoplastic polyurethane resins; polyamide resins, such as the nylon resins, including polyhexamethylene adipamide; polysulfone resins; polycarbonate resins; phenoxy resins; polyacetal resins; polyalkylene oxide resins such as polyethylene oxide and polypropylene oxide; polyphenylene oxide resins; and cellulose ester resins such as cellulose nitrate, cellulose acetate and cellulose propionate.

Also included within the term "polymer" are blends of two or more polymeric materials. Illustrative of such blends are polyethylene/polypropylene; low density polyethylene/high density polyethylene; polyethylene with olefin interpolymers such as those indicated above, for example, ethylene-acrylic acid copolymers, ethylene-ethyl methacrylate copolymers, ethylene-ethylacrylate copolymers, ethylene-vinyl acetate copolymers, ethylene-acrylic acid-ethylacrylate terpolymers, ethylene-acrylic acid-vinylacetate terpolymers, and the like.

Also included within the term "polymer" are the metallic salts of those polymers or blends thereof which contain free carboxylic acid groups. Illustrative of such polymers are ethylene-methacrylic acid copolymers, ethylene-ethacrylic acid copolymers, styrene-acrylic acid copolymers, butene-acrylic acid copolymers, and the like.

Illustrative of the metals which may be used to provide the salts of such carboxylic acid polymers are the 1, 2, and 3 valent metals such as sodium, lithium, potassium, calcium, magnesium, aluminum, barium, zinc, zirconium, beryllium, iron, nickel, cobalt, and the like.

The polymers from which the blanks are shaped may be used to any of the forms in which they are commonly employed in the molding arts such as in the form of powder, pellets, granules, and the like, and blends of the same with one or more adjuvant materials. Such adjuvant materials would include materials such as plasticizers, heat and light stabilizers, fillers, pigments, processing acids, extenders, fibrous reinforcing agents, impact improvers and metal, carbon and glass fibers and particles.

The polymer based compositions to be expanded in the device of the present invention may be prepared by any of the commonly employed techniques employed for compounding such compositions. Such procedures would include techniques such as dry blending or hot compounding, as well as with or without the use of mixing equipment such as ribbon blenders, muller blenders, intensive mixer blenders, extruders, banbury mixers and the like.

Although metallic materials of construction are usually only used as the mold plates in the device of the present invention, it is possible that expanded blanks of the present invention can also be made wherein a low melting metal, or alloy or compound thereof, can be used as the blank with mold plates made from non-fusible materials, or materials having higher fusion points than such low melting metallic materials.

Some rigid polymeric materials such as polysulfone resins, polycarbonate resins, and certain vinyl resins such as polyvinyl chloride, tend to develop locked-in strains when press formed into blanks. When such strains are present, it is not possible to readily use the blanks in the device of the present invention unless the blanks are first annealed to relax such strains in the blank. This annealing can be accomplished in about 0.5 to 10 minutes at temperatures ranging from the heat distortion temperature to the melting point of the resin.

Where the compositions used for the thermoformable blank contain fillers, the expansion temperature may have to be increased 5° to 20°C. to compensate for the increased viscosity of the resulting compositions.

THE PLATENS OR MOLD PLATES

The two mold plates or platens used in the device of the present invention to pull the blank apart can be made of the same or different materials. The mold plates or platens may have continuous or perforated surfaces, they may also be porous or nonporous, planar or non-planar and matching.

During the molding operation it is desirable as noted above, to vent the interior portions of the blanks which are being pulled apart. The need for venting the blanks being expanded, as noted above, arises due to the fact that a vacuum is created within the interior sections of the blank by virtue of the increase of the volume of such interior portions during the expansion operation. If the blank is not vented during the expansion operation, atmospheric pressure could cause puncture of the extended rib sections of the expanded blank during the expansion operation. This venting of the expanded blank can also be accomplished by using perforated or porous mold plates.

The materials from which the mold plates or platens may be fabricated are normally solid materials which are either not fusible at the operating temperature or which have a melting point which is at least 10°C. higher than the melting point of the fusible material from which the blank is fabricated.

Non-fusible materials which may be used for the mold plates or platens would include cellulosic materials such as wood, paper, cardboard and compressed sawdust; thermoset or vulcanized compositions based on natural or synthetic resins; minerals such as graphite, clay and quartz; natural rock and stone materials such as marble and slate; building materials such as brick, tile, wallboard and concrete; and proteinaceous materials such as leather and hides.

Fusible materials having a relatively high Tg or Tm which could be used as the mold plates or platens would include metals such as aluminum, iron, lead, nickel, magnesium, copper, silver and tin, as well as alloys and compounds of such metals, such as steel, brass and bronze; vitreous materials such as glass, ceramics and porcelain; and thermoplastic resins having a relatively very high fusion point, such as the so called engineering plastics, such as polytetrafluoroethylene, nylon-6 resins, polyacetal resins, polyvinylidene fluoride, polyesters and polyvinyl fluoride; or fusible materials coated with polytetrafluoroethylene.

The use of mold release agents such as silicone oils and fluorocarbon oils, or the use of mold plates made of materials having a low surface energy such as polytetrafluoroethylene, will insure the separation of the cooled expanded blank from the mold plates or platens after the expansion operation, when the cooled expanded blank would not otherwise readily separate from the mold plates or platens.

As noted above, one or both of the surfaces of the plates which are used to adhere to, and pull and expand the blank of plastic, may be an integral part of the press platens or molding device. One or both of the mold plates may also be removably mountable on the platen or molding device. The use of the removable type of mold plate is preferably where the mold plates are to be perforated or porous, so as to effect the venting therethrough, or where laminates are to be formed.

For various applications it may be desirable to promote the adhesion of the expanded blank to the mold plates, as in the formation of laminates. Certain compounds can be used as adhesion promoters for such purposes. The preferred of these adhesion promoters are various organosilicon compounds. These adhesion promoters may be used as primers and applied to the surfaces of the laminae substrates in layers which are at least mononolecular in depth. The adhesion promoters may also be incorporated or admixed in with the components of the blank. In the latter case, the adhesion promoter is added to the blank in an amount of about 0.00001 to 5.0 per cent by weight based on the weight of the blank.

When the organo-silicon compound is to be used as a primer or incorporated into the blank, it may be used in the form of a solution in an organic solvent such as an alcohol, an ester, a ketone, an aromatic or aliphatic hydrocarbon, a halogenated hydrocarbon, or mixtures of such solvents.

Examples of the organo-silicon compounds which may be used include silyl peroxide compounds, alkoxy silanes, amino-alkoxy silanes, vinyl alkoxy silanes and amino-alkylalkoxy silanes.

The silyl peroxide compounds may be in the form of a monomer or polymer, e.g., silane or siloxane. They may, in fact, be any silicon-containing compound which contains an organo-peroxy group bonded to silicon, which organo moiety is bonded to the peroxy oxygen and thence to the silicon by a non-carbonyl carbon atom.

These silyl peroxides can be made pursuant to the processes described in U.S. Pat. No. 3,631,161 and in copending U.S. application Ser. No. 034,897 filed May 5, 1970.

Specific examples of such silyl peroxide compounds are vinyl tris(t-butylperoxy)silane, allyl tris(t-butylperoxy)silane, tetratris(t-butylperoxy)-silane, allyl(t-butylperoxy)tetrasiloxane, vinyl methyl bis(t-butylperoxy)silane, vinyl tris ($\alpha$, $\alpha$-dimethyl benzylperoxy)-silane, allyl methyl bis(t-butylperoxy) silane, methyl tris(t-butylperoxy)silane, dimethyl bis(t-butylperoxy)-silane, isocyanatopropyl tris(t-butylperoxy)silane and vinyl diacetoxy(t-butylperoxy) silane.

The amino alkyl alkoxy silanes would include those having the structure:

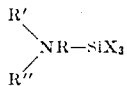

wherein X is alkoxy, aroxy or acryloxy; R is divalent alkylene of 3-8 carbon atoms with at least 3 sequential carbon atoms separating N from Si; at least one of R' and R'' is hydrogen, an any remaining R' or R'' is alkyl, HO $[CH_2CH\ (0)_x]$ 1-5 where x is 0 or 1, $H_2NCO-$, $H_2NCH_2CH_2-$ and $H_2NCH_2CH_2NHCH_2CH_2 -$.

Examples of such aminoalkyl-alkoxy silanes would include gamma-aminopropyltriethoxy silane, gamma-aminopropyltrimethoxy silane, bis(beta-hydroxy methyl) gamma-aminopropyl triethoxy silane and N-beta-(aminoethyl)gamma-aminopropyl triethoxy silane.

The following examples are merely illustrative of the present invention and are not intended as a limitation upon the scope thereof.

The press used in these examples was a spring loaded Carver press, as shown in FIGS. 2 to 4 of the drawings. Two springs were used in the press and each had a deflection of 130 pounds per inch, and the springs were designed to mechanically pull the platens apart, as explained above with reference to FIGS. 2 to 4, at a predetermined rate, as regulated by a needle valve on the hydraulic ram of the press. The platens of the press were malleable cast iron and could be cooled by conduction, as desired, by the circulation of cold water therethrough. The platens of the press could also be heated by conduction, as desired, by heating platens 3a and 3b electrically. The temperature of the surfaces of the heated platens was measured with a thermocoupled pyrometer.

EXAMPLE 1

A 52 mil thick expanded steel mesh, as shown in FIG. 1, was mechanically fastened to each of the platens of a Carver press. The diamond shaped pattern of the mesh had three-eighths by 1 inch openings with a 115 mil face width for the flat metal mesh strand. A 6 × 6 inches smooth surfaced sheet of polyethylene (having a density of 0.96, a melt index of 3; a Tm of 130°–140°C. and a Ta of about 135°–140°C.) which was 120 mils thick was coated with a solution, in toluene, of a silyl peroxide adhesion promoter, vinyl tris(t-butyl peroxy) silane, on both surfaces of the sheet so as to provide such surfaces, after the evaporation of the toluene, with a coating of about 2 milligrams of the silyl peroxide per square inch of surface area. The thus coated sheet was placed in the press, as shown in FIG. 2, after the mesh platens had been heated to a temperature of 185°C. The platens of the press were then closed so as to subject the blank (the peroxide coated sheet) to a pressure of 10 psi, as shown in FIG. 3. The polymer in the blank fused and wet and adhered to the steel mesh mold plates. The temperature throughout the mold plates and the platens of the press were allowed to equilibrate and the temperature thereof dropped to 135°C. Then the mold plates were separated, as shown in FIG. 4, at a velocity of 1000 mils/15 seconds, and then cooled to about 125°C. Venting of the blank was done through the mesh of the mold plates and between the contacting surfaces of the platens of the press and the mesh plates. The normal contacting surfaces of the platens of the press and the mesh plates were rough enough so as to allow sufficient venting therebetween.

The expanded sheet, with the mesh plates adhered thereto, was removed from the press. The resulting composite structure, shown in FIG. 5, was three-fourths inch thick. The rib members of the expanded core of plastic were regularly spaced and firmly bonded to the mesh plates. A portion of the mesh surface of the composite, about 1 inch in diameter, was subject to a blow of 150 foot pounds which deformed the mesh plates and the expanded core, but did not cause adhesive delamination of the expanded core from the mesh plates. The resultant laminate was a structural core embodying two mesh skins suitable for an automobile dashboard or other portions thereof.

EXAMPLE 2

The procedure of Example 1 was followed except that the blank used was a sheet of a blend of polysulfone and silicone block copolymer. The sheet had a Tg of 180°C. and a Ta of about 300°C. The surfaces of the metal mesh plates that were to contact the blank were primed with a 5 percent solution of polysulfone in methylene chloride (as an adhesion promoter) and dried for 10 minutes at 275°C. prior to fastening the plates to the platens of the press.

The blank was fused between the mold plates in the press, at 375°C. and expanded at 340°C. When cooled and removed from the press the expanded blank was firmly bonded to both of the mesh plates. The expanded composite was about one inch thick and had regular spaced ribbing as shown in FIG. 5. This composite expanded blank could be used as a structural member in furniture frams, interior automotive framing and the like.

EXAMPLE 3

The procedure of Example 1 was followed using a 60 mil thick sheet of the same high density polyethylene as was used in Example 1. The sheet of plastic, however, was not treated with the silyl peroxide adhesion promoter. The mesh mold plates were heated to 180°C. before the sheet of plastic was inserted therebetween. The sheet was then expanded about 5.4 times its original thickness. When then removed from the press and cooled to < 125°C., the expanded plastic readily separated from the mesh plates, was light weight and rigid, and had the configuration of the expanded core member 2' shown in FIG. 5 with regular rib spacing.

EXAMPLE 4

The procedure of Example 3 was followed using as the blank, a 60 mil thick sheet of polypropylene which had a melt index of 5, a Tm of 165°-175°C. and a Ta of about 170°C. The polypropylene blank was inserted between mold plates heated to 195°C., and was expanded at 170°C. The resulting expanded blank, when cooled, readily separated from the mesh plates. It was one inch thick, had a weight of three pounds per square yard and had the configuration of expanded core member 21 shown in FIG. 5. This expanded blank floated on water and could serve as an evaporation shield and water cooling tower fill.

EXAMPLE 5

The procedure of Example 3 was followed using, as the blank, a 60 mil thick sheet of a thermoplastic polyester polyurethane which had a Tm of about 130°-170°C. and a Ta of about 160°-180°C. The polyurethane blank was inserted between mold plates heated to 175°C. and expanded at about 160°C. to four times its original thickness. The resulting expanded blank, readily separated from the mesh mold plates. It was resilient and had the configuration of expanded core member 21 shown in FIG. 5. The expanded blank could be used as a cushion pad, rug cushioning or automotive padding.

EXAMPLE 6

A perforated metal sheet, as shown in FIG. 6, was placed over a porous stainless steel metal plate and fastened mechanically to the top platen of the Carver press with the porous metal plate between the perforated sheet of metal and the top platen of the Carver press. A 120 mil thick sheet of the high density polyethylene used in Example 1 was inserted into the press, between the lower, smooth surfaced platen of the press and the perforated sheet of metal, after the platens of the press and the fastened metal sheet and plate were heated to 160°C. The press was then closed to slightly compress the plastic and to effect hot tack adhesion between the plastic and the contacting metal surfaces of the perforated metal sheet and the smooth face of the lower platen of the press. The temperature of all the metal surfaces was allowed to equilibrate at 135°C. and then the press was opened so as to expand the plastic about 250 mils. The plastic was then cooled to about 60°C. and it readily separated from the two metal surfaces acting as mold surfaces. The top of the resulting expanded sheet of plastic exhibited a positive replication of the perforated metal sheet and the bottom of the expanded sheet of plastic had a continuous smooth surface, as shown in FIGS. 7 and 8 of the drawings. the resultant expanded blank was rigid in flexure and suitable as a pallet.

EXAMPLE 7

An expanded sheet of plastic was prepared as in Example 6 from a mixture of 15 percent by weight of an ethylene-acrylic acid copolymer and 85 percent by weight of the high density polyethylene of Example 1. The copolymer contained 83 percent by weight of ethylene and 17 percent by weight of acrylic acid. The blend was prepared by hot rolling the components on a two roll mill at full steam pressure (192 lbs./sq. in.). The blend had a Ta of about 120°C. The blend was molded into a 6 × 6 inches plaque which was 120 mils thick. Prior to inserting the plaque in the press the contacting faces of both of the platens were sprayed with a fluorocarbon polymer release agent. The plaque was processed in the Carver press as in Example 6. The plaque was inserted in the press at 170°C. and expanded at 140°C. The plaque was expanded to a new thickness of 1 inch at a rate of 1000 mils/15 seconds. The expanded plaque was then cooled and it readily separated from the platens. The expanded plaque had the configuration shown in FIGS. 7 and 8 of the drawings.

Subsequent placement of 20 mil thick aluminum plates heated to 185°C. onto this cooled expanded core, with slight pressure to ensure wetting resulted in a composite structural core having an integrally bonded skin upon cooling.

EXAMPLE 8

A 6 inches × 6 inches × 120 mil sheet of the polyethylene of Example 1, was expanded between two different mold surfaces as in Example 6. The top mold was a sheet of the expanded metal mesh used as the mold surface in Example 1. The lower mold surface was a smooth surfaced solid sheet of carbon steel 32 mils in thickness. Each of mold surfaces were removably mounted in the Carver press. The two contacting surfaces of the sheet of plastic were treated with a silyl peroxide adhesion promoter as in Example 1. The sheet of plastic was then expanded as in Example 1 so as to provide an expanded composite which was seven-eighths inch thick and had a configuration somewhat like that of the expanded article shown in FIG. 7, except that the cells in the upper face of the expanded article were diamond shaped, as the cells in the faces of the expanded article shown in FIG. 5. Venting of the voids or cells that appeared in the upper portion of the expanding blank during the expansion step in the process was accomplished through the mesh perforations in the face of the upper mold plate and through the interface between perforated mold surfaces of the expanded metal mesh and the upper platen of the Carver press. The rib members of the expanded core of plastic had an I beam configuration.

EXAMPLE 9

This example discloses the preparation of an expanded article having another configuration. A sheet of metal diamond shaped expanded mesh as shown in FIG. 1 of the drawings was fastened face to face to a sintered stainless steel porous plate. Two of such assemblies were made, one of which was attached to the face of the upper platen, and the other of which was attached to the lower platen, of the Carver press so that the porous plate in each case was adjacent the contact face of a platen of the press. The surfaces of the expanded mesh were then in a position to contact the blanks that were inserted in the press. The faces of the two metal mesh platens were also so arranged that the diamond shaped openings in the metal mesh plates faced each other at right angles, that is, one of the expanded metal mesh surfaces was turned at an angle of 90° to the other. A 60 mil thick sheet of the polyethylene of Example 1 was placed between the expanded mesh mold surfaces heated to a temperature of 180°C. The press was then closed to slightly compress the sheet of plastic and to effect hot tack adhesion between the sheet of plastic and the metal mesh mold surfaces. When the sheet of plastic then changed to a clear glossy state, the press was open so as to expand the sheet of plastic 5.4 times its original thickness. The resulting voids in the expanding sheet were vented through the perforations in the metal mesh mold surfaces and through the porous metal plates attached thereto. The expanded sheet was then cooled and it readily separated from the platens. It was rigid and lightweight and had a configuration somewhat like that of the article shown in FIG. 5 of the drawings, except that the upper cells in the expanded plastic were at right angles to the lower cells in the expanded object.

EXAMPLE 10

Using the procedure of Example 9 a 60 mil thick sheet of polypropylene was inserted into the press at 195°C. and expanded at 170°C. When the expanded sheet was cooled it readily separated from the mold surfaces and had the same configuration as the expanded article made in Example 9. The expanded plastic was 1 inch thick and weighed 3 pounds per square yard. The polypropylene resin used had a $Tm$ of 165°–175°C., a $Ta$ of 170°C., a density of 0.905 and a melt index of 5.

EXAMPLE 11

Using the procedure of Example 9 a 60 mil thick sheet of a thermoplastic polyester polyurethane was inserted into the press at 175°C. and expanded at 200°C. to four times it original thickness. When the expanded sheet was cooled it readily separated from the mold surfaces and had the same configuration as the expanded article made in Examples 9–10. The sheet of expanded plastic was resilient. The resin had a $Ta$ of 160°–180°C.

EXAMPLE 12

This example discloses the preparation of an expanded article having another configuration. Perforated stainless steel plates one-eighth inch thick and having, as the perforations therein, regularly spaced holes measuring about five-sixteenths inch in diameter were prepared. The holes were placed in aligned rows and columns in the plates, with each hole spaced about one-eighth inch from the next adjacent hole. One of the perforated plates was then attached to each of the platens of a Carver press, as were the metal mesh plates 1 shown in FIGS. 2–4 of the drawings. The perforated plates were so positioned on the faces of the top and bottom platens of the press that the opening of each hole of the upper perforated plate was exactly aligned with the opening of a hole in the lower perforated metal plate. A 6 inches × 6 inches × 60 mil sheet of the polyethylene of Example 1 was then inserted between the perforated metal mold surfaces which were heated to 180°C. The press was then closed to sligthly compress the sheet of plastic and to effect hot tack adhesion between the sheet of plastic and the contact surfaces of the perforated plates. The temperature of the platens and the metal mold surfaces was allowed to equilibrate at 135°C. and then the press was opened to expand the plastic to a thickness of three-fourths inch. During the expansion step the resulting voids in the expanding plastic were vented through the perforations in the metal plates and through the interface between the perforated plates and the platens of the press. The expanded plastic was then cooled and it then was readily separated from the perforated metal plates. The perforated areas of the metal plates were reproduced as holes in the expanded sheet of resin, with the solid portions of the faces of the perforated plates being duplicated as solid flanges on the top and bottom faces of the expanded article joined by webs of plastic through the cross-section of the expanded sheet. Each of the holes in the top of the expanded plastic sheet was aligned with a hole in the bottom of the expanded sheet so that the expanded sheet provided a series of cells having a circular opening at the top and bottom thereof with uniform walls therebetween.

EXAMPLE 13

This example discloses the preparation of an expanded article as shown in FIGS. 15–16 of the drawings. Perforated aluminum plates one-eighth × 6 × 6 inches and having, as the perforations therein, regularly spaced holes measuring about three-fourths inch in diameter were prepared. The holes were placed in aligned rows and columns in the plates, as shown in FIG. 12, with each hole spaced about three-sixteenths inch from the next adjacent hole. One of the perforated plates was then attached to each of the platens of a Carver press so that the two perforated plates provided the overlap pattern for the perforations in the plates as shown in FIG. 14 of the drawings. The perforated plates were thus positioned on the faces of the top and bottom platens of the press so that the opening of each perforation of the upper perforated plate overlapped three of the perforations in the lower perforated metal plate. A 6 inches × 6 inches × 60 mil sheet of polyethylene (having a density of 0.96, a melt index of 3, a $Tm$ of 130°-140°C. and a $Ta$ of about 135°-140°C.) was then inserted between the perforated metal mold surfaces which were heated to 180°C. The press was then closed to slightly compress the sheet of plastic and to effect hot tack adhesion between the sheet of plastic and the contact surfaces of the perforated plates as shown in FIG. 3. The temperature of the platens and the metal mold surfaces was allowed to equilibrate at 140°C. and then the press was opened to expand the plastic to a thickness of three-fourths inch. During the expansion step the resulting voids in the expanding plastic were vented through the perforations in the metal plates and through the interface between the perforated plates and the platens of the press. The expanded plastic was then cooled and it then was readily separated from the perforated metal plates. The expanded sheet had the configuration of the article shown in FIGS. 15 to 16 of the drawings. The perforated areas of the metal plates were reproduced as open cells (23 and 24 in FIG. 16) in the expanded sheet of resin, with the solid portions of the faces of the perforated plates being duplicated as solid flanges on the top and bottom faces of the expanded article and joined by webs of plastic through the cross-section of the expanded sheet. The cells were all of uniform volume and height. The panel was rigid.

EXAMPLE 14

This Example discloses the preparation of an expanded article 40 as shown in FIGS. 20 to 21 of the drawings. The mold plates used were those shown in FIGS. 17 to 19. One of the perforated plates was attached to each of the platens of a Carver press so that the two plates provided the overlap pattern shown, in replication, in the expanded blank of FIG. 20. A 6 inches × 6 inches × 100 mil sheet of the polyethylene of Example 1 was then inserted between the perforated metal mold surfaces which were heated to 210°C. The press was then closed to slightly compress the sheet of plastic and to effect hot tack adhesion between the sheet of plastic and the contact surfaces of the perforated plates. The temperature of the platens and the metal mold surfaces was allowed to equilibrate at 190°C. and then the press was opened to expand the plastic to a thickness of 1 ¼ inch. During the expansion step the resulting voids in the expanding plastic were vented in turn through perforations 34, vent holes 35, channels 35A, and the open wall of U-shaped frame 32 as discussed above. The expanded plastic was then cooled and it then was readily separated from the perforated metal plates. The expanded sheet had the configuration of the article shown in FIGS. 20 to 21 of the drawings. The perforated areas of the metal plates were reproduced as open cells (43 and 44 in FIG. 21) in the expanded sheet of resin, with the solid portions of the faces of the perforated plates being duplicated as solid flanges on the top and bottom faces of the expanded article joined by webs of plastic through the cross-section of the expanded sheet. The cells were all of uniform volume and height. The panel was rigid and useful as an interior wall panel core structure having rigid skin lamina of one-sixteenth inch melamine phenolic resin bonded thereto by contact adhesives.

EXAMPLE 15

This example illustrates the use of negative perforation means. A 10 mil thick sheet of aluminum was perforated with a series of ¾ inch holes to produce a punched out sheet having the configuration of mold plate 19 as shown in FIG. 12. The ¾ inch holes were aligned in staggered rows and columns as shown in FIG. 19, and were spaced about three-sixteenths inch from the next adjacent hole. This perforated aluminum sheet was then placed over the surface of a 65 mil thick sheet (6 × 6 inches) of impact grade styrene which had a $Ta$ of 180°C. A release paint made of 75 percent by weight of white clay (−200 mesh), 5 percent by weight of toluene and 20 percent by weight of ethyl alcohol was used to paint the circular portions of the polystyrene sheet that were exposed through the circular perforations in the aluminum mask, so that a pattern of circular discs of the release paint remained, upon subsequent removal of the aluminum mask. The thus treated plaque of polystyrene was then dried in an oven at 75°C. for 10 minutes and cooled. A similar pattern of circular discs of release paint was then applied to the other side of the plaque of resin, in the same manner. The pattern of the circular discs was applied to the two opposite faces of the plaque of resin so that when the plaque was laid flat on one such side, the pattern of the circular discs on each of the two faces of the plaque overlapped, in the vertical plane, three of the circular discs in the other face of the plaque. This pattern of overlap was similar to that provided by the two mold plates of FIG. 14 of the drawings.

The dried plaque was then inserted into a Carver Press between an upper and a lower aluminum mold plate which were affixed to the upper and lower platens, respectively of the press. Each of these two mold plates has a series of small vent holes drilled (No. 60 drill, one-half inch on centers) through the plates. The vent holes were so positioned on the mold plates, and the plaque of polystyrene was so positioned between the mold plates, that at least one such vent hole was adjacent each of the circular discs of release paint on each side of the plaque ot the interfaces between the plaque and the two mold plates. The plaque of resin was inserted into the press while the platens and the mold plates were at a temperature of 210°C., and the plaque was expanded at the rate of about 15 mils/-second, at 200°C., to an expanded height of 500 mils.

During the expansion step in the process voids or cells of reduced pressure formed in the blank at the site of the circular discs of release paint, in the same way that cells 23 and 24 formed in expanded blank 22 shown in FIGS. 15 and 16. These cells adjacent the release paint were vented during the expansion step through the vent holes in the mold plates. The expanded blank was rigid and had the configuration of the expanded blank shown in FIGS. 15 to 16 of the drawings. The cells in the expanded blank had openings which were essentially the same diameter as that of the circular discs of release paint. After the expansion step, and the blank was cooled, the release paint adhered to the walls and bases of the cells of the expanded blank. The paint could be removed, or left on the blank, depending on the intended end use application.

EXAMPLES 16–23

Eight blanks, in the form of 6 × 6 inch plaques, of eight different thermoplastic materials were expanded as disclosed above with the mold plate of FIG. 9 as an upper mold plate and the smooth surface of the lower platen of a Carver press as a lower mold plate, to produce expanded objects as shown in FIGS. 10 to 11. The blanks were of various initial thicknesses, and they were expanded to various height. Table I below lists:

a. the polymeric material used in each plaque;
   b. the Ta of each such polymeric material, in °C.;
   c. the initial thickness, in mils, of the plaque when it was inserted in the press;
   d. the temperature of the platens and upper mold plate when the plaque was inserted in the press;
   e. the temperature of the platens, upper mold plate, and plaque at the start of the expansion step in the process;
   f. the final thickness of the expanded blank, in mils;
   g. comments on the flexibility or rigidity, and on the clarity or color of the resulting expanded blank.

During the expansion process the blanks were expanded at the rate of about 15–20 mils per second.

press it, and when the temperature of the press equilibrated at 205°C. the blank was expanded at the rate of 15 mil/second to an expanded height of 875 mils. The expanded blank was cream colored, opaque, and rigid, and had the configuration of the expanded blank 51 shown in FIGS. 24–26 of the drawings.

Various polymeric resins used as the expandable blanks tend to pick up moisture when exposed to the atmosphere, i.e., about 0.05 to 5.0 weight percent. This moisture is preferably removed from the plastic before inserting the plastic in the hot press so as to avoid blistering or bubbling in the heated plastic. The plastics which are more susceptible to this type of moisture absorption are the polycarbonate resins, polymethymethacrylate resins, nylon resins, cellulose acetate resins, acrylonitrile-butadiene-styrene terpolymer resins, hydroxy propyl cellulose resins, styrene-acrylonitrile copolymer resins and phenoxy resins.

TABLE I

| Example | Polymer | Ta-° C. | Initial thickness, mils | Insertion temp., ° C. | Expansion temp., ° C. | Expanded thickness, mils | Comments |
|---|---|---|---|---|---|---|---|
| 16 | Polycarbonate | 320 | 80 | 280 | 270 | 240 | Rigid, black. |
| 17 | 94.2/5.7 ethylene-ethyl acrylate copolymer. | 110 | 60 | 140 | 130 | 240 | Very flexible, clear. |
| 18 | Polymethylmethacrylate | 160 | 120 | 180 | 180 | 630 | Rigid, clear. |
| 19 | Thermoplastic polyurethane polyether polyester. | 160–180 | 100 | 170 | 160 | 310 | Very flexible, somewhat opaque, yellow. |
| 20 | Nylon-6 | 240 | 65 | 250 | 240 | 325 | Moderately flexible, relatively opaque. |
| 21 | Polystyrene | 185 | 60 | 190 | 185 | 240 | Rigid-clear. |
| 22 | (Rigid) polyvinyl chloride | 155 | 130 | 205 | 195 | 650 | Rigid, clear, yellow. |
| 23 | Polyethylene; 0.96 density 4 melt index | 135–140 | 60 | 160 | 150 | 300 | Rigid-clear. |

NOTES.—(1) The polymeric material used in Example 16 was General Electric Co.'s Lexan polycarbonate which was filled with 4% by weight of carbon black. (2) The plaque of polyvinyl chloride used in Example 22 was annealed at 150° C. for 5 minutes prior to be inserted in the press, to remove stresses therein.

EXAMPLE 24

This example discloses the preparation of an expanded article 51 as shown in FIGS. 24–26 of the drawings. The mold plates used were those shown and aligned as mold plates 19 and 47 in FIG. 23.

The resin expanded was a 75 mil thick sheet (6 × 6 inches) of acylonitrile-butadiene-styrene terpolymer which had a Ta of 180°C.

Mold plate 19 was the same as in Example 13, and mold plate 47 was a 6 × 6 × ⅛ inches aluminum sheet.

The small holes 50 of mold plate 47 had a diameter of three-eighths inch, the larger holes 49 had a diameter of one-half inch and the square holes 48 measured ½ × ½ inch. All of these perforations in mold plate 47 were positioned one inch from the center of the next adjacent perforation, in each diagonal alignment of such perforations, and the centers of all of the perforations were aligned in each vertical column and horizontal row thereof. As shown in FIG. 22, the square holes were one-half inch from each other in the vertical columns thereof and three-eighths inch from each other in the horizontal rows thereof. The large circular holes or perforations were positioned seven-sixteenths inch from each other, and from the square perforations, in the vertical columns thereof. The small circular holes or perforations were positioned five-eighths inch from each other, and from the square perforations, in the vertical columns thereof.

The two mold plates were fastened to the upper and lower platens of a Carver press in the alignment shown in FIG. 23 of the drawings. The platens and the mold plates were then heated to 220°C. and the blank of terpolymer resin was inserted between the mold plates. The plates were closed on the blank to slightly com-

What is claimed is:

1. A device for expanding the cross section of thermoformable material which comprises
   a base mold plate and a top mold plate,
   each of said plates having a surface for contacting said thermoformable material when said thermoformable material is inserted between said plates, said surfaces having a fusion point of ≥ 70°C. and being adapted to bond, in a non-molten state, to thermoformable material by hot tack adhesion having a hot tack adhesion temperature which is less than the fusion point of the surfaces,
   at least one of said mold plates being adapted to vent air through a portion thereof during the expanding of said thermoformable material between said plates by pulling said plates apart while said thermoformable material is bonded thereto by hot tack adhesion,
   means to heat said plates to the hot tack adhesion temperature of said thermoplastic material, and
   means to pull said plates apart while said thermoformable material is bonded thereto.

2. A device as in claim 1 in which at least one of said mold plates has channel means in the thermoplastic material contact surface thereof.

3. A device as in claim 2 in which said channel means is in the form of a grid of recessed channels.

4. A device as in claim 1 in which at least one of said mold plates is perforated with a plurality of perforations.

5. A device as in claim 4 in which said perforations are arranged in an ordered pattern.

6. A device as in claim 5 in which said perforations are angular.

7. A device as in claim 6 in which said perforations are hexagonal.

8. A device as in claim 6 in which said perforations are diamond shaped.

9. A device as in claim 5 in which said perforations are arcuate.

10. A device as in claim 9 in which said perforations are circular.

11. A device as in claim 4 in which both of said mold plates are perforated.

12. A device as in claim 11 in which the perforations in each mold plate are the same.

13. A device as in claim 11 in which the perforations in each mold plate are dissimilar.

14. A device as in claim 12 in which the perforations in the two mold plates are not aligned.

15. A device as in claim 13 in which the perforations in the two mold plates are not aligned.

16. A device as in claim 1 in which at least one of said mold plates is porous.

17. A device as in claim 1 in which the contact surfaces of said mold plates are positioned in a vertical plane with respect to each other.

18. A device as in claim 18 in which said means to pull said plates apart is adapted to pull said plates apart in a vertical plane.

19. A device as in claim 1 in which the contact surfaces of said mold plates are positioned in a horizontal plane with respect to each other.

20. A device as in claim 19 in which said means to pull said plates apart is adapted to pull said plates apart in a horizontal plane.

* * * * *

UNITED STATES PATENT OFFICE
CERTIFICATE OF CORRECTION

Patent No. 3,765,810    Issue Date October 16, 1973

Inventor(s) Walter H. Smarook

It is certified that error appears in the above-identified patent and that said Letters Patent are hereby corrected as shown below:

Column 2, line 67 "13-15" should read -- 12-15 --.

Column 3, line 2, in the column headed "Ta" "155 240" should read -- 155 --.

Column 3, lines 3-4, "of polymethylo-nitrile & styrene" should be deleted.

Column 6, penultimate line, "of", second occurrence, should read -- or --.

Column 7, line 14 --,-- should be inserted before "two".

Column 8, line 13, "wich vent hold" should read --which vent hole --.

Column 13, line 20 "1" should read -- 13 --.

Column 13, line 48, "18" should be deleted.

Column 13, line 65, "palte" should read -- plate --.

Column 14, line 37, "34" should read - 24 - .

Column 16, line 25, "cell 40" should read -- cell 43 --.

Column 17, line 19, "positions" should read -- portions --.

Column 19, line 33 "to" should read -- in --.

Column 21, line 1 "preferably" should read --preferable --.

Column 21, line 12 "mononolecular" should read --monomolecular--.

UNITED STATES PATENT OFFICE
CERTIFICATE OF CORRECTION

Page 2

Patent No. 3,765,810           Issue Date October 16, 1973

Inventor(s) Walter H. Smarook

It is certified that error appears in the above-identified patent and that said Letters Patent are hereby corrected as shown below:

Column 21, line 60 that portion of the first structure reading "$CH_2CH$" should read -- $CH_2CH_2$ --.

Column 23, line 19, "frams" should read -- frames --.

Column 23, at each of lines 46 and 60, "21" should read -- 2' --.

Column 26, line 24, "sligthly" should read -- slightly --.

Column 29, line 4, "height" should read -- heights --.

Column 29, in Example 19 of Table I, "polyether" should be deleted.

Column 30, in Note (2) of table I, "be" should read -- being --.

Column 30, lines 43-45 should read -- thermoformable material by hot tack adhesion when said thermoformable material has a hot tack adhesion temperature which is less than the fusion point of said surfaces, --.

Column 30, line 53, "thermoplastic" should read -- thermoformable-

Column 32, line 7, "18", second occurrence, should read --17--.

Signed and sealed this 7th day of May 1974.

(SEAL)
Attest:

EDWARD M. FLETCHER, JR.
Attesting Officer

C. MARSHALL DANN
Commissioner of Patents